US008923151B2

United States Patent
Ochiai

(10) Patent No.: US 8,923,151 B2
(45) Date of Patent: Dec. 30, 2014

(54) QUALITY CONTROL APPARATUS, MOVING IMAGE TRANSMISSION SYSTEM, QUALITY CONTROL METHOD, AND RECORDING MEDIUM

(75) Inventor: Katsuhiro Ochiai, Tokyo (JP)

(73) Assignee: NEC Corporation, Tokyo (JP)

( * ) Notice: Subject to any disclaimer, the term of this patent is extended or adjusted under 35 U.S.C. 154(b) by 134 days.

(21) Appl. No.: 13/509,754

(22) PCT Filed: Nov. 15, 2010

(86) PCT No.: PCT/JP2010/070642
§ 371 (c)(1),
(2), (4) Date: May 14, 2012

(87) PCT Pub. No.: WO2011/065294
PCT Pub. Date: Jun. 3, 2011

(65) Prior Publication Data
US 2013/0003571 A1    Jan. 3, 2013

(30) Foreign Application Priority Data
Nov. 24, 2009    (JP) .................. 2009-266018

(51) Int. Cl.
| H04L 1/00 | (2006.01) |
|---|---|
| H04N 21/6373 | (2011.01) |
| H04N 21/438 | (2011.01) |
| H04L 1/20 | (2006.01) |
| H04N 21/442 | (2011.01) |
| H04N 21/6379 | (2011.01) |
| H04N 21/2383 | (2011.01) |
| H04L 12/26 | (2006.01) |

(52) U.S. Cl.
CPC ............ *H04L 1/203* (2013.01); *H04N 21/6373* (2013.01); *H04L 43/0888* (2013.01); *H04L 1/0017* (2013.01); *H04L 43/04* (2013.01); *H04L 1/0009* (2013.01); *H04L 1/0014* (2013.01); *H04L 1/0019* (2013.01); *H04L 43/0835* (2013.01); *H04N 21/4382* (2013.01); *H04N 21/44209* (2013.01); *H04N 21/6379* (2013.01); *H04N 21/2383* (2013.01)
USPC ........................................................ 370/252

(58) Field of Classification Search
None
See application file for complete search history.

(56) References Cited

U.S. PATENT DOCUMENTS

| 2002/0136164 | A1 | 9/2002 | Fukuda et al. |
|---|---|---|---|
| 2003/0126238 | A1* | 7/2003 | Kohno et al. ................. 709/220 |

(Continued)

FOREIGN PATENT DOCUMENTS

| JP | 2001-230809 A | 8/2001 |
|---|---|---|
| JP | 2003-179663 A | 6/2003 |
| JP | 2004-072720 A | 3/2004 |
| JP | 2004-193991 A | 7/2004 |
| JP | 2005-175837 A | 6/2005 |
| JP | 2006-054562 A | 2/2006 |

(Continued)

OTHER PUBLICATIONS

Japanese Office Action dated Aug. 14, 2014 issued in Japanese Application No. 2009-266018.

*Primary Examiner* — Anh-Vu Ly
*Assistant Examiner* — Gustavo Lopez-Vargas
(74) *Attorney, Agent, or Firm* — Sughrue Mion, PLLC

(57) ABSTRACT

A moving image transmission system determines adequate number of packets, which are corresponding to redundant portion, in accordance with a network state.
The moving image transmission system estimates a correlation between a transmission bit rate and a packet loss rate based on both of information which indicates the packet loss rate and bit rate information, and determines the packet loss rate, which makes an encode bit rate of moving image data maximum, based on the correlation, and determines redundancy, which is applied to the moving image data, based on the determined packet loss.

12 Claims, 17 Drawing Sheets

(56) References Cited

U.S. PATENT DOCUMENTS

| | | |
|---|---|---|
| 2003/0231589 A1 | 12/2003 | Itoh et al. |
| 2009/0122716 A1* | 5/2009 | Hayashi ........................ 370/252 |
| 2009/0138784 A1 | 5/2009 | Tamura et al. |
| 2009/0225170 A1* | 9/2009 | Yamagishi et al. ............ 348/192 |
| 2010/0150243 A1* | 6/2010 | Kure et al. ................ 375/240.24 |

FOREIGN PATENT DOCUMENTS

| | | |
|---|---|---|
| JP | 2006-262288 A | 9/2006 |
| JP | 2007-134836 A | 5/2007 |
| JP | 2009-124354 A | 6/2009 |
| JP | 2009-159368 A | 7/2009 |

* cited by examiner

QUALITY CONTROL APPARATUS, MOVING IMAGE TRANSMISSION SYSTEM, QUALITY CONTROL METHOD, AND RECORDING MEDIUM

CROSS REFERENCE TO RELATED APPLICATIONS

This application is a National Stage of International Application No. PCT/JP2010/070642 filed Nov. 15, 2010, claiming priority based on Japanese Patent Application No. 2009-266018 filed Nov. 24, 2009, the contents of all of which are incorporated herein by reference in their entirety.

TECHNICAL FIELD

The present invention relates to a quality control method for a moving image.

BACKGROUND ART

In the case that a moving image transmission apparatus uses a network whose network bandwidth is not secured sufficiently for providing the internet service and the mobile communication service, an available network bandwidth of the moving image transmission apparatus becomes unstable due to various causes. There is a moving image transmission apparatus to transmit contents, such as a moving image, which require high level throughput continuously, through the network. The moving image transmission apparatus suffers from frequent stop of playing back the contents due to shortage of the network bandwidth. Hereinafter, it is defined that the moving image includes any one or both of a moving picture and a voice.

As one of general methods to solve the above-mentioned problem in this field, there is a method that the moving image transmission apparatus carries out data compensation for a packet loss by use of Forward Error Correction (FEC) which has a fixed redundancy. In the case that characteristics of the network, which is used for transmitting the moving image, is known in advance, it is possible to compensate the data in real time with a simple method of using FEC. However, in the case that many packet losses exceeding a packet loss rate which is estimated, in advance, on the basis of the network characteristics, are caused, the moving image transmission apparatus can not compensate the lost packet. Accordingly, the moving image transmission apparatus has a defect that it is difficult to use FEC in the network whose available bandwidth is changed significantly. In order to avoid the problem, the moving image transmission apparatus assigns firstly large redundancy to data related to a service, and then provides the service. In this case, the moving image transmission apparatus transmits the packet excessively even in a state that the network has almost no problem. Accordingly, the moving image transmission apparatus consumes the network bandwidth more than necessity.

As another general method to solve the above-mentioned problem in this field, there is a method that a moving image receiving apparatus requests to re-send lost data and the moving image transmission apparatus re-sends the requested data to improve immunity against the packet loss. In the case that the method is used, the moving image transmission apparatus has an advantage that the network bandwidth, which is required for re-sending the data, is narrow, since the moving image transmission apparatus re-sends only the lost data. However, in the case that the method is used, it takes the following time for re-sending the data, that is, a time until the moving image transmission apparatus recognizes that the packet loss is caused, a time requisite to requesting to resend the data, and a time requisite to re-sending the lost data. Accordingly, in the case that the method is used, long latency is caused in an interval from transmitting the data firstly until regenerating the data. As a result, a defect that the real-time characteristic is lost is caused.

As a method, which remedies the defect of FEC, out of the above-mentioned methods, a method denoted as Adaptive FEC is proposed in a non-patent literature (NPL) 1. The moving image transmission apparatus, which uses the Adaptive FEC, changes the redundancy dynamically so as to minimize the packet loss. Accordingly, it is possible that the moving image transmission apparatus restrains the packet loss even if the moving image transmission apparatus communicates through the network whose available bandwidth is changed to some extent. Moreover, in the case that the network is in a good state, it is possible that the moving image transmission apparatus transfers the moving image with making the redundancy not so large. As a result, it is possible to reduce an ineffective use of the network bandwidth.

However, according to the method described in the non-patent literature 1, the moving image transmission apparatus makes the redundancy large in the case that the network enters into a bad state. For this reason, the moving image transmission apparatus transmits and receives excessively the packets which include an amount of data corresponding to the redundancy. Therefore, according to the method described in the non-patent literature 1, there is a possibility that the moving image transmission apparatus falls into a bad cycle of making the network state degraded furthermore. As a method to improve the problem, there is a method which is described in a patent literature 1. According to the patent literature (PTL) 1, the moving image transmission apparatus reduces packets which carry data of the moving image, and determines an encoding bit rate of the moving image so that a bandwidth, which is corresponding to a total number of packets including the data of the moving image and packets including redundancy data of FEC, may be narrower than the network bandwidth. As a result, it is possible that the moving image transmission apparatus obtains the best quality of the moving image without degrading the network quality.

According to further another method described in a patent literature (PTL) 2, in a situation that the network state becomes degraded, the moving image transmission apparatus carries out transmitting and receiving the packet with giving priority to the packet carrying the moving image, and restrains to transmit the packet based on FEC. As a result, even if the network state becomes degraded abruptly, the moving image transmission apparatus can prevent that the network state becomes degraded furthermore due to the packet which the moving image transmission apparatus transmits and receives.

PRECEDING TECHNICAL LITERATURE

Patent Literature

[PTL 1]: Japanese Patent Application Laid-Open No. 2006-262288

[PTL 2]: Japanese Patent Application Laid-Open No. 2005-175837

Non Patent Literature

[NPL 1]: Shimizu, et al. "Implementation of Adaptive FEC by dynamic re-configurable system", Information Processing Society of Japan DA symposium 2003, pp. 25 to 30. 2003/July

BRIEF SUMMARY OF THE INVENTION

Problem to be Solved by the Invention

The related arts mentioned above have a problem that the moving image transmission apparatus can not determine adequate number of the packets, which are corresponding to a redundant portion, based on correlation between the encoding bit rate and the packet loss rate of the moving image. The reasons are as follows. According to the art described in the non-patent literature 1, number of the packets, which are corresponding to the redundant portion, is determined on the basis of the network state. Therefore, according to the art described in the non-patent literature 1, there is a possibility that the packet, which is corresponding to the redundant portion and which is transmitted and received by the moving image transmission apparatus, furthermore makes the network congested frequently, and consequently the packet loss rate is degraded. Moreover, according to the art described in the patent document 1, it is assumed that the moving image transmission apparatus uses all the available network bandwidth, and a change of the packet loss rate due to a change of the encode bit rate of the moving image is not taken into the consideration. Accordingly, in the case that there are a plurality of apparatuses which compete with each other for the network and a plurality of the apparatuses transmit and receive a plurality of the moving images simultaneously, it is difficult that the moving image transmission apparatus estimates an adequate network bandwidth which the moving image transmission apparatus can use. According to the technology described in the patent literature 2, to change the encoding bit rate of the moving image is not taken into the consideration. Therefore, according to the art described in the patent literature 2, the packet loss rate may be lowered in some cases through not transmitting and not receiving the packet which is added through the moving image transmission apparatus applying FEC, but there is a possibility that the image quality is degraded furthermore due to the packet loss.

One of the objects of the present invention is to provide a quality control apparatus or the like which determines adequate number of packets, which are corresponding to the redundant portion, in accordance with a correlation between the encoding bit rate and the packet loss rate of the moving image.

Means to Solve the Problem

A first quality control apparatus according to an exemplary embodiment of the present invention includes:

a state information receiving unit to receive network state information which includes both of a packet loss rate of moving image data caused at a certain time and time information indicating the certain time;

a state information record storing apparatus to store bit rate information, which includes both of a transmission bit rate of the moving image data caused at a certain time and time information indicating the certain time, in association with the network state information which includes the time information; and a moving image quality control unit to read both of information indicating the packet loss rate which is associated with the time information included in each packet of the moving image data and the transmission bit rate from the state information record storing apparatus, and to estimate a correlation between an encode bit rate and the packet loss rate of the moving image data based on each of the read information, and to determine the packet loss rate, which makes the encode bit rate of the moving image data maximum, based on the correlation, and to determine redundancy, which is applied to the moving image data, based on the determined packet loss rate.

A first moving image transmission system according to an exemplary embodiment of the present invention includes a moving image transmission apparatus and a moving image receiving apparatus.

In the above configuration, the moving image transmission apparatus includes:

a transmission unit which transmits moving image data at a predetermined transmitting bit rate;

a state information receiving unit to receive network state information which includes both of a packet loss rate of the moving image data caused at a certain time and time information indicating the time;

a state information record storing apparatus to store bit rate information, which includes both of the transmission bit rate of the moving image data used at a certain time and time information indicating the time, in association with the network state information which includes the time information; and a moving image quality control unit to read both of the information indicating the packet loss rate which is associated with the time information included in each packet of the moving image data and the transmission bit rate from the state information record storing apparatus, and to estimate a correlation between an encode bit rate and the packet loss rate of the moving image data based on each of the read information, and to determine the packet loss rate, which makes the encode bit rate of the moving image data maximum, based on the correlation, and to determine redundancy, which is applied to the moving image data, based on the determined packet loss rate.

The moving image receiving apparatus includes:

a data receiving unit which receives the moving image data from the moving image transmission apparatus; and a state information transmitting unit to transmit both of the packet loss rate of the moving image data and time information indicating a time, at which the moving image transmission apparatus transmits each the packet included in the moving image data, to the moving image transmission apparatus.

A first quality control method according to an exemplary embodiment of the present invention includes:

receiving network state information which includes both of a packet loss rate of moving image data caused at a certain time and time information indicating the time; making a storage apparatus store bit rate information, which includes both of a transmitting bit rate of the moving image data used at a certain time and time information indicating the time, in association with the network state information which includes the time information;

reading both of the information indicating the packet loss rate which is associated with the time information included in each packet of the moving image data and the transmitting bit rate from the storage medium;

estimating a correlation between an encode bit rate and the packet loss rate of the moving image data based on each of the read information;

determining the packet loss rate, which makes the encode bit rate of the moving image maximum, based on the correlation; and determining redundancy, which is applied to the moving image data, based on the determined packet loss rate.

A non-transitory recording medium according to an exemplary embodiment of the present invention stores a first program which makes a computer execute:

a process to receive network state information which includes both of a packet loss rate of moving image data caused at a certain time, and time information indicating the certain time;

a process to make a storage medium store bit rate information, which includes both of a transmitting bit rate of the moving image data used at a certain time and time information indicating the certain time, in association with the network state information which includes the time information;

a process to read both of the information indicating the packet loss rate, which is associated with the time information included in each the packet of the moving image data and the transmission bit rate from the storage medium;

a process to estimate a correlation between an encode bit rate and the packet loss rate of the moving image data based on each of the read information;

a process to determine the packet loss rate, which makes the encode bit rate of the moving image data maximum, based on the correlation; and a process to determine redundancy, which is applied to the moving image data, based on the determined packet loss rate.

Effect of the Invention

According to the moving image transmission apparatus of the present invention, it is possible to determine the adequate number of the packets, which are corresponding to the redundant portion, in accordance with the correlation between the encode bit rate and the packet loss rate of the moving image.

EXEMPLARY EMBODIMENT TO CARRY OUT THE INVENTION

An exemplary embodiment according to the present invention will be described in detail in the following. Here, components which have the same function are assigned the same code in each exemplary embodiment which is described in each drawing and the specification.

First Exemplary Embodiment

Figure 1:
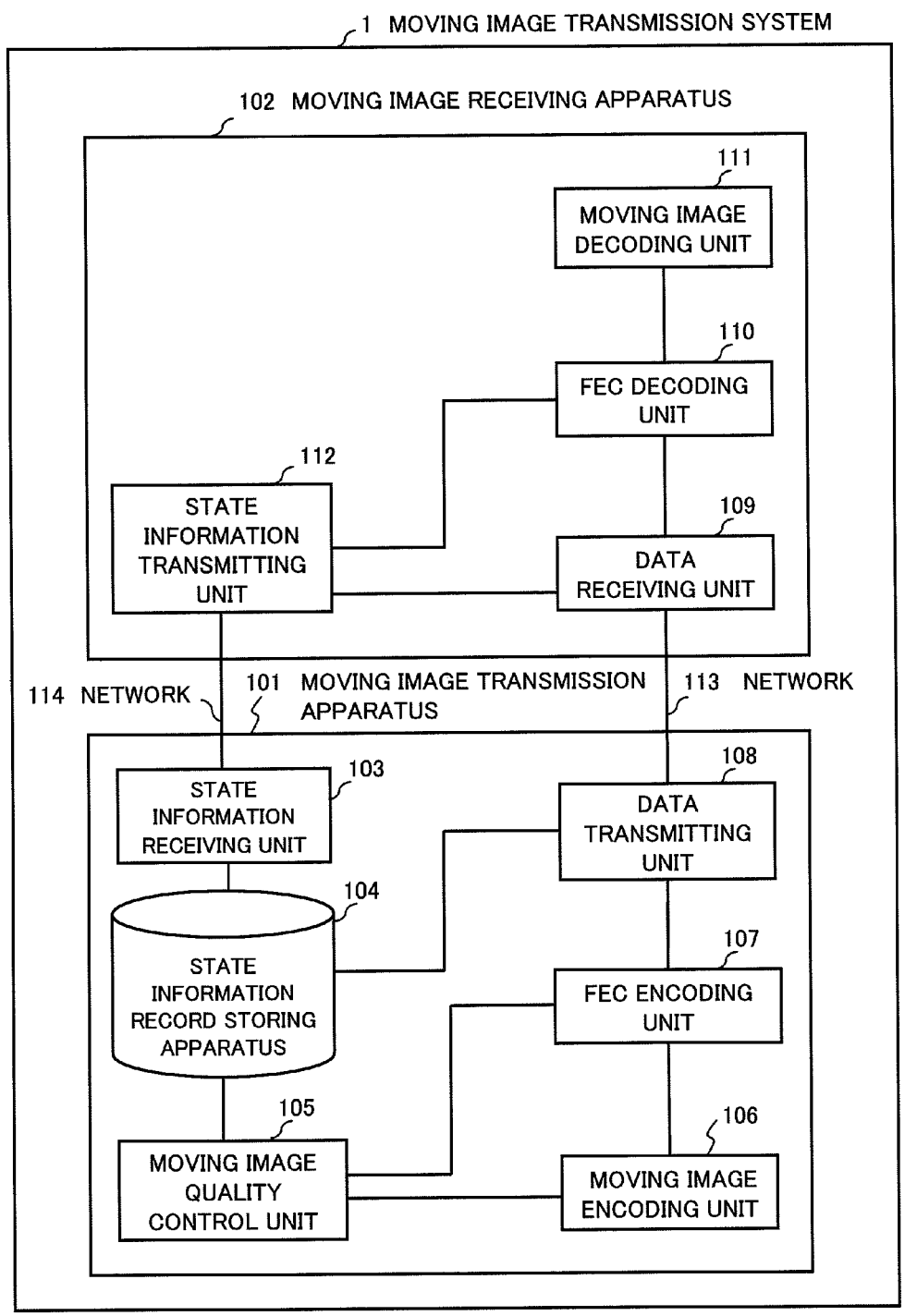
FIG. 1 is a block diagram showing a configuration according to a first exemplary embodiment of the present invention.

FIG. 1 is a block diagram exemplifying a configuration of a moving image transmission system 1 according to a first exemplary embodiment of the present invention.

The moving image transmission system 1 includes a moving image transmission apparatus 101 and a moving image receiving apparatus 102. The moving image transmission apparatus 101 and the moving image receiving apparatus 102 are connected each other via a network 113 and a network 114.

Moving Image Transmission Apparatus 101

The moving image transmission apparatus 101 includes a state information receiving unit 103, a state information record storing apparatus 104, a moving image quality control unit 105, a moving image encoding unit 106, a FEC encoding unit 107 and a data transmitting unit 108. The moving image encoding unit 106, the FEC encoding unit 107 and the data transmitting unit 108 compose a transmission unit which transmits moving image data at a predetermined transmission bit rate. A configuration of the transmission unit is not limited to the configuration shown in FIG. 1. The transmission unit may operate as a transmission circuit based on control by CPU or operations as another hardware circuit. The state information receiving unit 103 is connected with the state information record storing apparatus 104. The state information record storing apparatus 104 is connected with the state information receiving unit 103, the moving image quality control unit 105 and the data transmitting unit 108. The moving image quality control unit 105 is connected with the state information record storing apparatus 104, the moving image encoding unit 106 and the FEC encoding unit 107. The moving image encoding unit 106 is connected with the moving image quality control unit 105 and the FEC encoding unit 107. The FEC encoding unit 107 is connected with the moving image quality control unit 105, the moving image encoding unit 106 and the data transmitting unit 108. The data transmitting unit 108 is connected with the state information record storing apparatus 104 and the FEC encoding unit 107.

State Information Receiving Unit 103

The state information receiving unit 103 receives network state information on the network 113 via the network 114.

The network state information may include information which indicates a packet transmitted by the moving image transmission apparatus 101. Moreover, the network state information may include information which indicates a packet loss rate caused before FEC decoding, information which indicates the packet loss rate caused after the FEC decoding, or a cyclic counter value.

The information, which indicates the packet transmitted by the moving image transmission apparatus 101, may be a time stamp value which indicates a time when the packet is transmitted or the time stamp value which indicates a relative time from a time to start transferring the moving image. Moreover, the information, which indicates the packet transmitted by the moving image transmission apparatus 101, may be a sequence number assigned to each the packet. That is, it is enough that the information, which indicates the packet, can specify a time when each the packet is transmitted by the moving image transmission apparatus 101. The information which can specify the time is also called time information.

The information which indicates the packet loss rate caused before the FEC decoding may be number of data which can not be received (lost data) by the moving image receiving apparatus 102 within a fixed period of time. Moreover, the information which indicates the packet loss rate caused before the FEC decoding may be a ratio of number of the packets, which the moving image receiving apparatus 102 can not receive normally, to number of all the packets which the moving image receiving apparatus 102 receives. For example, the state information receiving unit 103 may calculate the packet loss rate caused before the FEC decoding by use of number of data which are transmitted by the moving image transmission apparatus 101 within a fixed period of time, and number of data which the moving image receiving apparatus 102 loses within the fixed period of time.

The information which indicates the packet loss rate caused after the FEC decoding may be number of data, which can not be decoded even by use of FEC, out of the data which the moving image receiving apparatus 102 receives within a fixed period of time. Moreover, the information which indicates the packet loss rate caused after the FEC decoding may be a ratio of number of data, which the moving image receiving apparatus 102 can not decode even by use of FEC, to number of all the packets which the moving image receiving apparatus 102 receives. For example, the state information receiving unit 103 may calculate the packet loss rate caused after the FEC decoding based on number of the data which the moving image receiving apparatus 102 receives, and number of the data which the moving image receiving apparatus 102 can not decode out of the received data even by use of FEC.

The cyclic counter value, which is assigned to each packet, is within a predetermined range. The counter value is assigned to each packet successively in an order of the packet. In the case that the count value reaches one end value of the predetermined range, a following packet is assigned the other end value of the predetermined range. It may be configured so that the data transmitting unit 108 may assign the cyclic counter value to each the packet.

State Information Record Storing Apparatus 104

The state information record storing apparatus 104 receives the network state information from the state information receiving unit 103. Moreover, the state information record storing apparatus 104 stores network state record information. The network state record information is generated by associating the network state information which the state information record storing apparatus 104 receives, and transmission bit rate information which is corresponding to the information indicating the packet included in the network state information. The transmission bit rate information is generated by associating the transmission bit rate of data which the moving image transmission apparatus 101 transmits, and a time at which the data is transmitted at the transmission bit rate.

The data transmitting unit 108, which will be described later, makes the state record storing apparatus 104 store the transmission bit rate information.

Moving Image Quality Control Unit 105

Firstly, the moving image quality control unit 105 reads the network state record information on the packets, which the moving image transmission apparatus 101 transmits within a predetermined period of time, out of the network state record information which the state information record storing apparatus 104 stores. Specifically, the moving image quality control unit 105 determines whether a time, which is determined by the information indicating the packet included in each network state record information, is within the predetermined period of time. Moreover, the moving image quality control unit 105 specifies that the network state record information including information on the time, which is within the predetermined period of time, is the network state record information which the moving image quality control unit 105 reads. In the case that the information which indicates the packet is the time stamp value, the moving image quality control unit 105 may determine whether a time which the time stamp value indicates is within the predetermined period of time. Moreover, in the case that the information which indicates the packet is the sequence number, the moving image quality control unit 105 may determine with the following method whether the information which indicates the packet is within the predetermined period of time. First of all, the data transmitting unit 108 generates information which associates the sequence number of each the packet, and the time at which the moving image transmission apparatus 101 transmits the packet corresponding to the sequence number. Then, the moving image quality control unit 105 may determine on the basis of the information generated by the data transmitting unit 108 whether the information which indicates the packet is within the predetermined period of time.

Secondly, the moving image quality control unit 105 estimates a first correlation formula by determining a correlation between the transmission bit rate and the packet loss rate, which are included in each the network state record information, on the basis of the network state record information which is read. For example, the moving image quality control unit 105 may determine the first correlation formula with the minimum square error method.

In the case that denotation "correlation between transmission bit rate and packet loss rate" is used in the specification, the denotation "packet loss rate" means any one of the packet loss rate caused before the FEC decoding and the packet loss rate caused after the FEC decoding.

The moving image quality control unit 105 estimates an encode bit rate of the moving image, which the moving image transmission apparatus 101 transmits, based on the transmission bit rate which is determined by the first correlation formula. For example, the moving image quality control unit 105 estimates the encode bit rate of the moving image based on the determined transmission bit rate, a header size of the moving image data at the transmission bit rate, and a data size of FEC data which is redundant data of FEC. Specifically, the moving image quality control unit 105 may estimate the encode bit rate by subtracting a bit rate which is corresponding to data size of the header, and a bit rate which is corresponding to data size of the FEC data from the transmission bit rate.

Thirdly, the moving image quality control unit 105 estimates a second correlation formula by determining a correlation between the estimated encode bit rate of the moving image, and the packet loss rate. For example, the moving image quality control unit 105 may determine the first correlation formula with the minimum square error method.

Then, the moving image quality control unit 105 determines the packet loss rate, which makes an inclination of a graph showing the second correlation formula (that is, a derivative value of the correlation formula) zero, on the basis of the estimated second correlation formula. That is, the moving image quality control unit 105 determines the packet loss rate, which makes the encode bit rate of the moving image maximum, on the basis of the correlation relation between the encode bit rate and the packet loss rate of the moving image. Then, the moving image quality control unit 105 determines redundancy of FEC on the basis of the packet loss rate.

Here, the redundancy means a value equal to subtraction of number of bits, which are included in the packet and are indispensable as actual data, from number of bits used to transfer the packet.

As another method to determine the redundancy of FEC, the moving image quality control unit 105 may determine the redundancy of FEC with the following method. The moving image quality control unit 105 may store a table, which associates the packet loss rate and the redundancy of FEC, in advance. Then, the moving image quality control unit 105 determines the redundancy of FEC on the basis of the packet loss rate with reference to the table. Moreover, the moving image quality control unit 105 may store a table, which associates the packet loss rate and a FEC control method (for example, information which indicates a cyclic period of FEC), in advance.

The moving image quality control unit 105 specifies finally that the encode bit rate of the moving image, which is corresponding to the determined packet loss rate (packet loss rate which makes the encode bit rate of the moving image maximum), is the encode bit rate of the moving image which the moving image transmission apparatus 101 transmits.

Fourthly, the moving image quality control unit 105 calculates the transmission bit rate of the moving image on the basis of the determined encode bit rate of the moving image and the redundancy of FEC. Specifically, the moving image quality control unit 105 may calculate the transmission bit rate of the moving image by adding a bit rate of data, which is determined on the basis of an amount of data necessary according to the redundancy of FEC, to the encode bit rate of the moving image.

Here, when the moving image quality control unit 105 determines the redundancy of FEC and the encode bit rate of the moving image, the moving image quality control unit 105 may adopt, as the determined value, not the value which is calculated directly by the second correlation formula, but an evaluated value which is equal to multiplication of the calculated value by a weighting coefficient. The weighting coefficient may be determined based on a difference between the current redundancy of FEC and the newly-determined redundancy of FEC, or a difference between the current encode bit rate of the moving image and the newly-determined encode bit rate of the moving image. In this case, the moving image quality control unit 105 mat determine that evaluated values, which are equal to multiplication of the newly-determined values by the predetermined weighting coefficients, are the redundancy of FEC and the encode bit rate of the moving image which are to be applied after the control respectively.

Meanwhile, degree of the correlation between the transmission bit rate and the packet loss rate may be influenced in some cases by degree that an amount of data, which is transmitted by the moving image transmission apparatus 101, occupies the network 113. For example, in the case that the network 113 has quite a wide bandwidth, a change of the packet loss rate may have almost no influence on the transmission bit rate of the data, which the moving image transmission apparatus 101 transmits, in some cases. In the case, the correlation between the transmission bit rate and the packet loss rate is weak. That is, the clear correlation between the packet loss rate and the transmission bit rate does not exist. In the case, the moving image quality control unit 105 may make the control reflect the determined value slightly, even if the packet loss rate is determined. For example, the moving image quality control unit 105 may carries out an evaluation of determining that an average of the current packet loss rate and the determined packet loss rate is a new packet loss rate.

On the other hand, in the case that the network 113 has a narrow bandwidth, the transmission bit rate of the data, which the moving image transmission apparatus 101 transmits, may be influenced severely by the change of the packet loss rate, and may be changed significantly in some cases. In the case, the correlation between the transmission bit rate and the packet loss rate is strong. That is, quite a clear correlation relation between the packet loss rate and the transmission bit rate is found. In the case, the moving image quality control unit 105 may determine the packet loss rate, and make the control reflect the determined value strongly. For example, the moving image quality control unit 105 may carry out an evaluation of determining that the new packet loss rate is equal to a value which is changed from the current packet loss rate by up to two times large differential-value of the current packet loss rate from the determined packet loss rate. It is possible that the moving image transmission system 1 carries out the precise control, which is adaptive to the situation, by adding the evaluation mentioned above.

Moreover, the moving image quality control unit 105 may adjust the value of the transmission bit rate, which is stored by the state information record storing apparatus 104, on the basis of the calculated transmission bit rate and the transmission bit rate of the data which is transferred currently. For example, the calculated transmission bit rate may be a target value which is achieved over a predetermined period of time from the present time. That is, the moving image quality control unit 105 may adjust the transmission bit rate, which is stored by the state information record storing apparatus 104, so as to become close to the calculated transmission bit rate gradually from the current transmission bit rate over the predetermined period of time.

According to the above-mentioned method, after the target value is achieved for a certain period of time, the value of the transmission bit rate, which is stored by the state information record storing apparatus 104, is actually coincident with the calculated transmission bit rate at a later time. On the other hand, in the case that the target value is changed within a certain period of time, the transmission bit rate, which is stored by the state information record storing apparatus 104, is adjusted at every time when the target value is changed so as to become close to the new target value gradually.

It is possible that the moving image transmission system 1 restrains an abrupt fluctuation of the moving image quality by virtue of the control.

Moving Image Encoding Unit 106

The moving image encoding unit 106 generates the moving image data by encoding the moving image on the basis of the encode bit rate which the moving image quality control unit 105 determines.

FEC Encoding Unit 107

The FEC encoding unit 107 generates the FEC data by use of the redundancy of FEC, which the moving image quality control unit 105 determines, on the basis of the moving image data which the moving image encoding unit 106 generates. The FEC encoding unit 107 is also called a redundant code encoding unit.

Here, the network state information which the state information receiving unit 103 receives may include the information which indicates the packet loss rate caused after the FEC decoding. In the case, that there is data which can not be decoded even by use of FEC indicates that there is a possibility that the continuous packet losses are caused in the network which the moving image transmission system 1 uses. In the case, when carrying out the FEC encoding, the FEC encoding unit 107 may contrive a means such as selecting an algorism, which has robustness against more continuous packet losses.

Data Transmitting Unit 108

The data transmitting unit 108 converts the moving image data, which the moving image encoding unit 106 generates, and the FEC data, which the FEC encoding unit 107 generates, into a data format which permits the transmission via the network 113, and transmits the converted data. The data transmitting unit 108 transmits each the packet which includes the information indicating the packet. Furthermore, the data transmitting unit 108 makes the state information record storing apparatus 104 store the transmission bit rate information. Here, the transmission bit rate information is generated by associating the transmission bit rate which is used when transmitting each the packet, and the information which indicates the time when the data is transmitted at the transmission bit rate.

The data transmitting unit 108 may assign the cyclic counter value to each the packet which is transmitted.

Moving Image Receiving Apparatus 102

The moving image receiving apparatus 102 includes a data receiving unit 109, a FEC decoding unit 110, a moving image decoding unit 111 and a state information transmitting unit 112.

Data Receiving Unit 109

The data receiving unit 109 receives the moving image and the FEC data, and calculates the packet loss rate caused before the FEC decoding. Moreover, the data receiving unit 109 transfers both of the information which indicates the packet including the received data, and the information, which indicates the packet loss rate caused before the FEC decoding in the moving image receiving unit 102, to the state information transmitting unit 112 which will be described later. The information which indicates the packet can be substituted by information which indicates a time interval from a point of time when the data receiving unit 109 notifies the state information transmitting unit 112 of the information which indicates the previous packet. Moreover, the information which indicates the packet loss rate caused before the FEC decoding in the moving image receiving apparatus 102 can be substituted by information which indicates an amount of the moving image data and the FEC data which are transmitted at a predetermined time.

Here, the information which indicates the time interval may be, for example, information which indicates a length of a predetermined period of time. Moreover, the information which indicates the time interval may be, for example, a difference between a current time and a time when the state information transmitting unit 112 transmits outward both of the information which indicates the previous packet, and the information which indicates the packet loss rate caused before the FEC decoding in the moving image receiving apparatus 102.

FEC Decoding Unit 110

The FEC decoding unit 110 restores the lost data on the basis of the moving image data and the FEC data which the data receiving unit 109 receives, and re-generates the moving image data which is not caused the lost data yet.

Moreover, the FEC decoding unit 110 may notify the state information transmitting unit 112, which will be described later, of the information which indicates the packet loss rate caused after the FEC decoding.

Moving Image Decoding Unit 111

The moving image decoding unit 111 plays back a moving picture and a voice by decoding the moving image data which the FEC decoding unit 110 restores. In order to decode the moving picture and the voice separately, the moving image decoding unit 111 may have different decoding units which decode the moving picture and the voice respectively.

State Information Transmitting Unit 112

From the data receiving unit 109, the state information transmitting unit 112 receives the information which indicates the packet, and the information which indicates the packet loss rate caused before the FEC decoding in the moving image receiving apparatus 102. Then, the state information transmitting unit 112 transmits the information which indicates the packet, and the information which indicates the packet loss rate caused before the FEC decoding outward through the network 114 as the network state information.

The network state information may include the information which indicates the packet loss rate caused after the FEC decoding.

Figure 2:
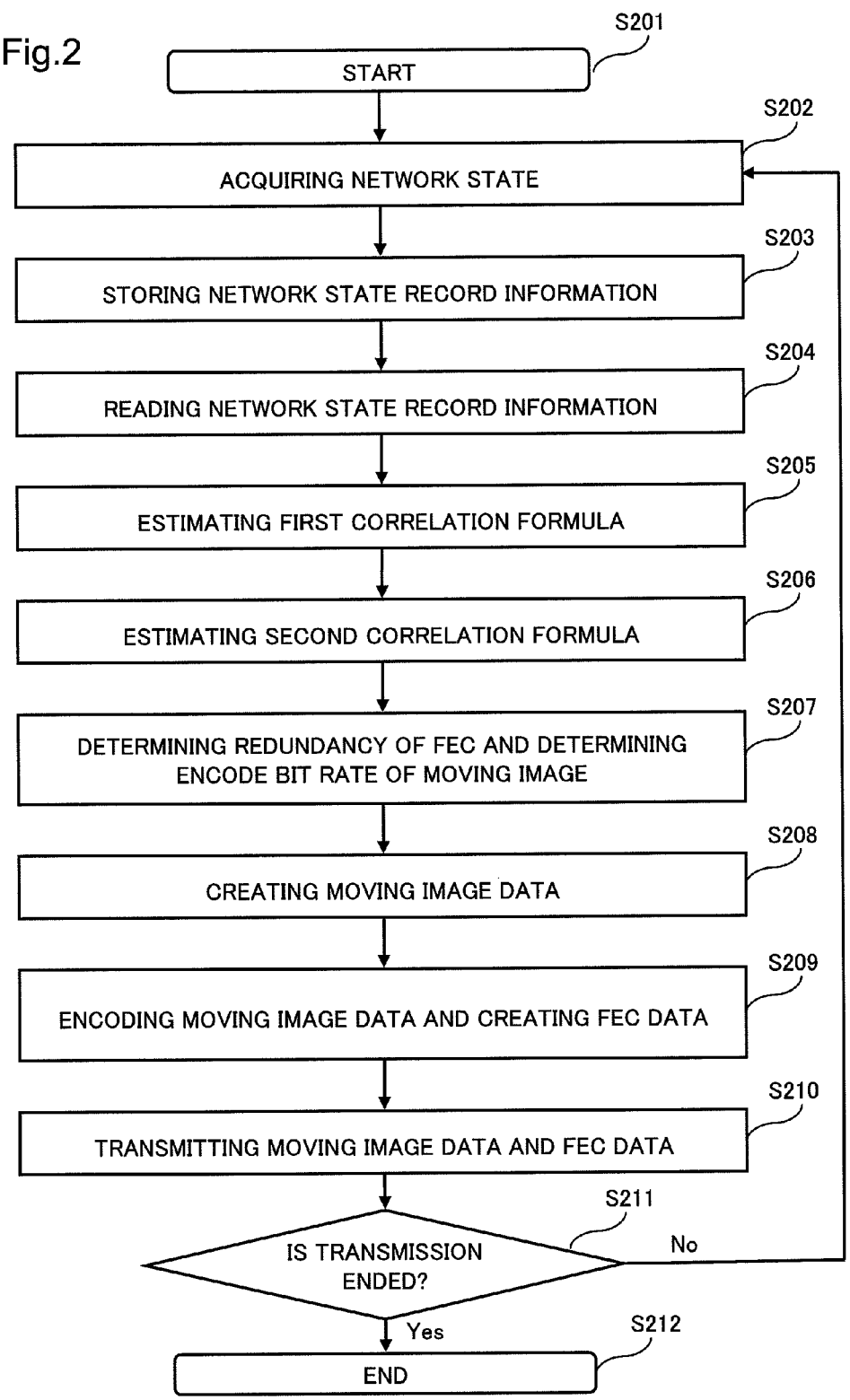
FIG. 2 is a flowchart exemplifying an operation of a moving image transmission apparatus 101 according to the first exemplary embodiment of the present invention.

FIG. 2 is a flowchart showing an outline of operations of the moving image transmission apparatus 101 according to the first exemplary embodiment of the present invention.

The moving image transmission apparatus 101 starts the operation (Step S201). The state information receiving unit 103 acquires the network state information on the network 113 via the network 114 (Step S202). The state information receiving unit 103 reads the transmission bit rate information of the moving image, which is generated at the time corresponding to the information indicating the packet, from the state information record storing apparatus 104 on the basis of the information, which indicates the packet, out of the received network state information. Then, the state information receiving unit 103 makes the state information record storing apparatus 104 store the network state record information which includes both of the received network state information and the transmission bit rate included in the read transmission bit rate information (Step S203).

The moving image quality control unit 105 reads the network state record information from the state information record storing apparatus 104 (Step S204). The moving image quality control unit 105 calculates the correlation between the transmission bit rate and the packet loss rate, which are recorded within a fixed period of time, on the basis of the read network state record information, and expresses the calculation result as the first correlation formula (Step S205). The moving image quality control unit 105 calculates the correlation between the encode bit rate and the packet loss rate of the moving image on the basis of the transmission bit rate which is determined by the first correlation formula, and expresses the calculation result as the second correlation formula (Step S206).

The moving image quality control unit 105 calculates the packet loss rate which makes an inclination (derivative value) of the determined second correlating formula zero, and determines the redundancy of FEC on the basis of the calculated packet loss rate. Moreover, the moving image quality control unit 105 determines the encode bit rate of the moving image, which is transmitted, on the basis of the encode bit rate corresponding to the determined packet loss rate (Step S207).

The moving image encoding unit 106 encodes the moving image at the encode bit rate which is determined in Step S207 to generate the moving image data (Step S208).

The FEC encoding unit 107 generates the FEC data by use of the redundancy of FEC, which is determined in Step S207, on the basis of the moving image data which the moving image encoding unit 106 generates (Step S209).

The data transmitting unit 108 converts the moving image data, which the moving image encoding unit 106 generates, and the FEC data, which the FEC encoding unit 107 generates, into a data format which permits the transmission via the network 113, and transmits the converted data. Furthermore, the data transmitting unit 108 associates the transmission bit rate which is used when transmitting the data, and the information which indicates the time when the data is transmitted at the transmission bit rate, and makes the state information record storing apparatus 104 store the association. (Step S210).

If another moving image to be transmitted still continues, the moving image transmission apparatus 101 repeats the same steps which start from Step S202 (Step S211). If any other moving image to be transmitted does not continue, the moving image transmission apparatus 101 ends the operation (Step S212).

Figure 3:
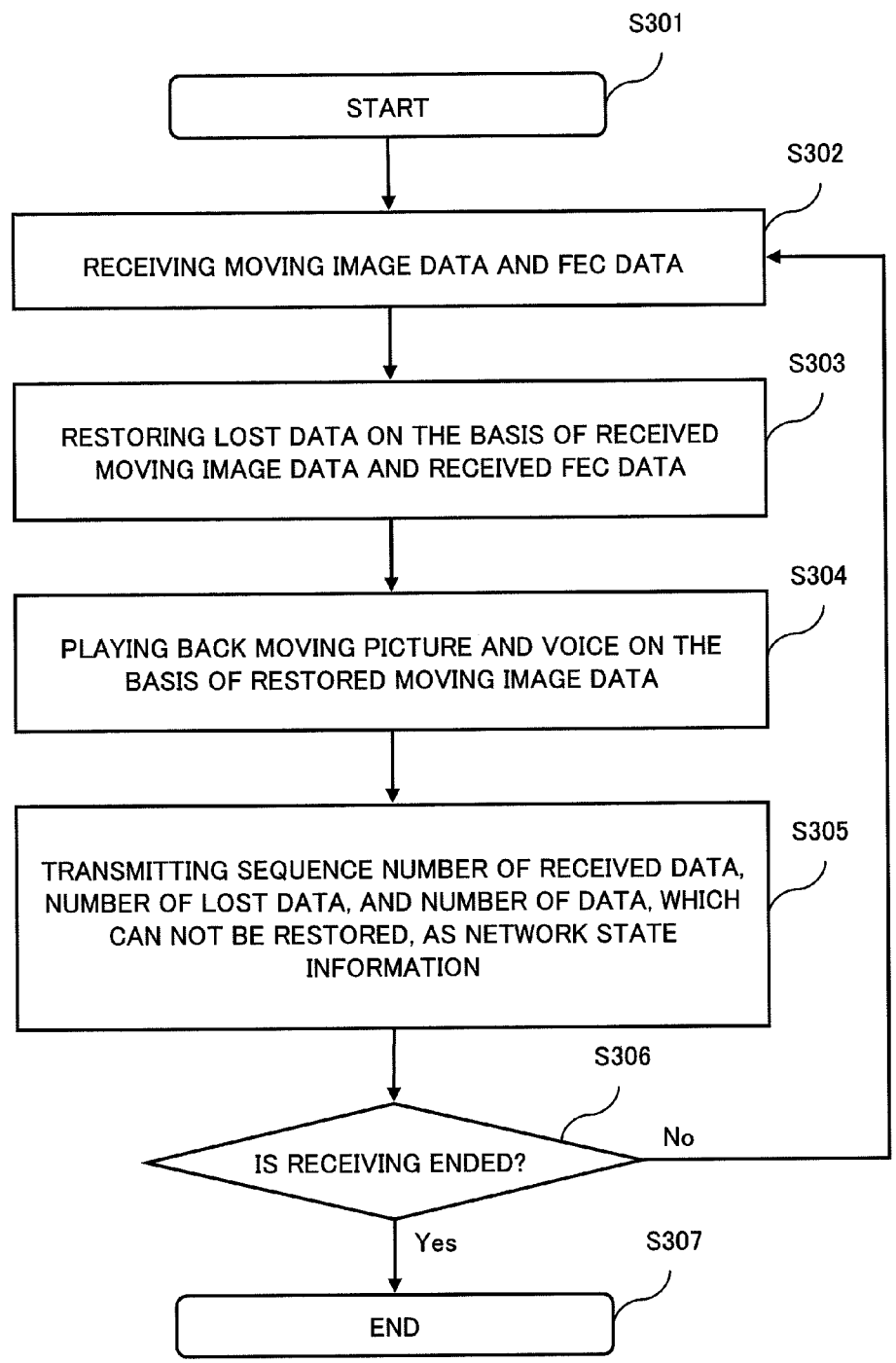
FIG. 3 is a flowchart exemplifying an operation of a moving image receiving apparatus 102 according to the first exemplary embodiment of the present invention.

FIG. 3 is a flowchart showing an outline of operations of the moving image receiving apparatus 102 according to the first exemplary embodiment of the present invention.

The moving image receiving apparatus 102 starts the operation (Step S301). The data receiving unit 109 receives the moving image data and the FEC data via the network 113, and transfers both the data to the FEC decoding unit 110. Moreover, the data receiving unit 109 notifies the state information transmitting unit 112 of the information which indicates the packet including the received data, and of the information which indicates the packet loss rate caused before the FEC decoding in the moving image receiving apparatus 102 (Step S302).

The FEC decoding unit 110 restores the lost data on the basis of the moving image data and the FEC data which are transferred by the data receiving unit 109, and re-generates the moving image data which is not caused the lost data yet (Step S303).

The moving image decoding unit 111 decodes the moving image data which the FEC decoding unit 110 generates, and plays back the moving picture and the voice (Step S304).

The state information transmitting unit 112 transmits the network state information outward via the network 114 (Step S305). The network state information includes the information which indicates the packet received from the data receiving unit 109, and the information which indicates the packet loss rate caused before the FEC decoding in the moving image receiving apparatus 102.

In the case that the data receiving unit 109 continues to receive the moving image, the moving image receiving apparatus 102 repeats the steps which start from Step S302 (Step S306). In the case that the data receiving unit 109 does not continue to receive the moving image, the moving image receiving apparatus 102 ends the operation (Step S307).

According to the first exemplary embodiment, the moving image transmission system 1 determines the packet loss rate, which makes the encode bit rate of the moving images maximum, on the basis of the correlation relation between the transmission bit rate and the packet loss rate of the data. Then, the moving image transmission system 1 determines the redundancy of the redundant code on the basis of the determined packet loss rate. Therefore, according to the moving image transmission system 1, it is possible to obtain a remarkable effect that the moving image transmission system 1 is possible to determine the adequate number of the packets, which carry the redundant data, on the basis of the correlation relation between the packet loss rate which indicates the states of the network 113 and the network 114, and the transmission bit rate of the data.

Description of Modified Example of Exemplary Embodiment

A modified example of the first exemplary embodiment will be described in the following.

With regard to the first exemplary embodiment, when the first correlation formula is estimated, the moving image quality control unit 105 may estimate a situation that the packet loss, which is observed in the network 113 and the network 114, is caused. Furthermore, the moving image quality control unit 105 may operate according to the estimated situation that the packet loss is caused (first modified example of the first exemplary embodiment). On the basis of the correlation relation between the transmission bit rate and the packet loss rate, the moving image quality control unit 105 classifies the situation that the packet loss is caused. Specifically, on the basis of conditions which the transmission bit rate and the packet loss rate satisfy, the moving image quality control unit 105 estimates the situation that the packet loss is caused. Then, the moving image quality control unit 105 changes the transmission bit rate, the redundancy of FEC, and the method of determining the transmission bit rate of the moving image, which are to be applied after the control, on the basis of the situation that the packet loss is caused.

Figure 4:
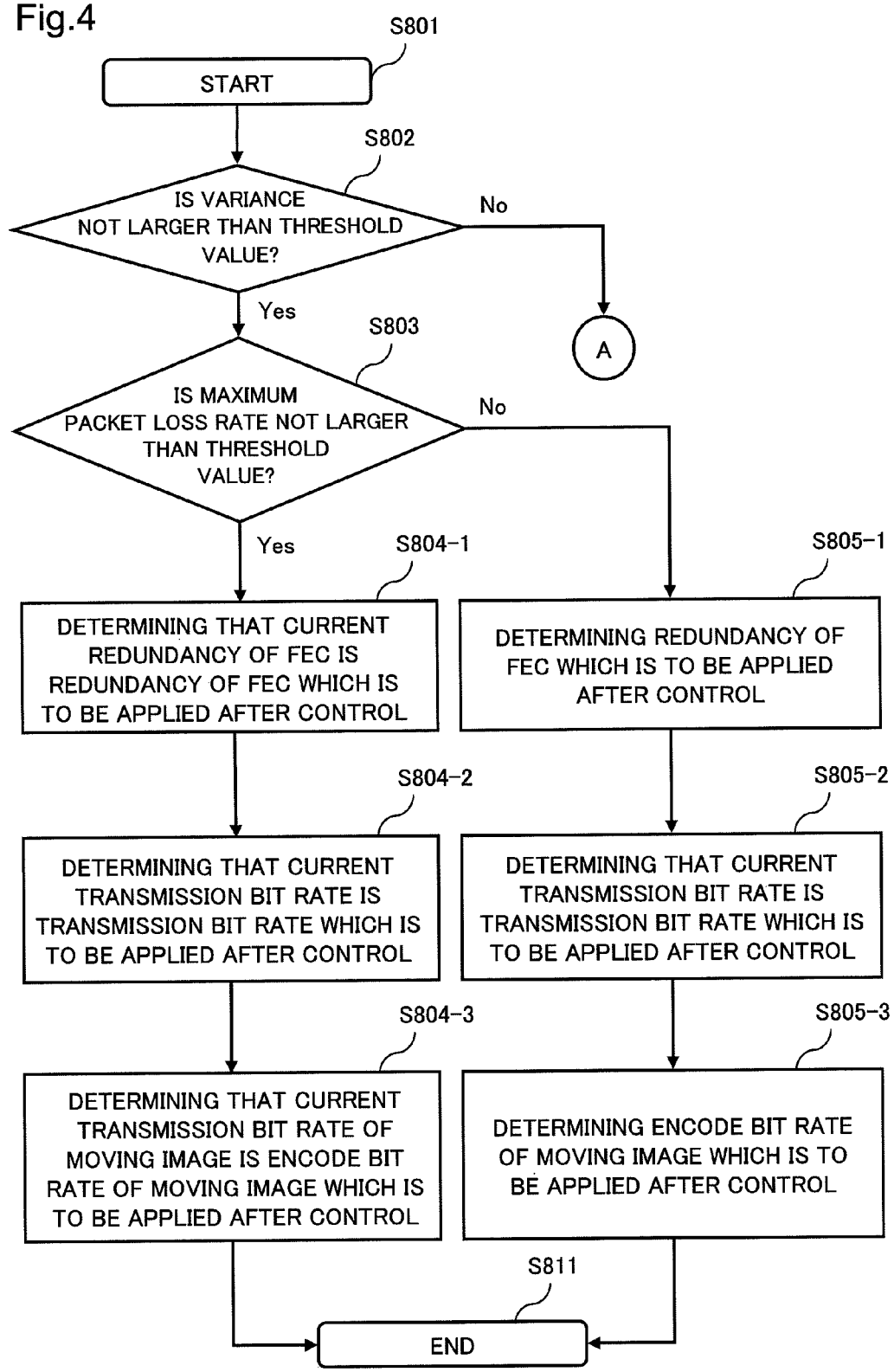
FIG. 4 is a part of a flowchart exemplifying an operation of a moving image quality control apparatus 105 according to the first exemplary embodiment of the present invention.
Figure 5:
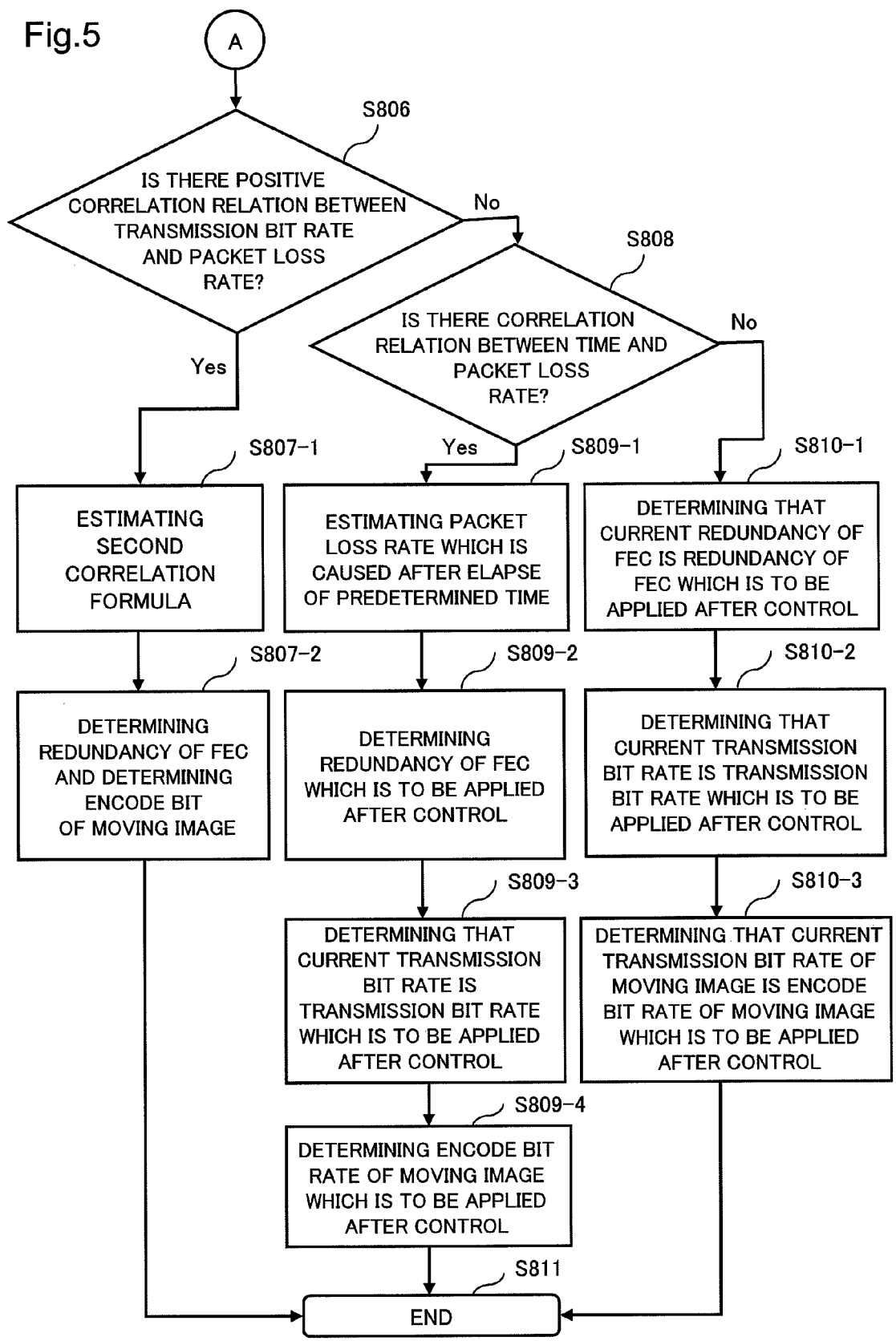
FIG. 5 is a part of a flowchart exemplifying an operation of a moving image quality control apparatus according to the first exemplary embodiment of the present invention.
Figure 6:
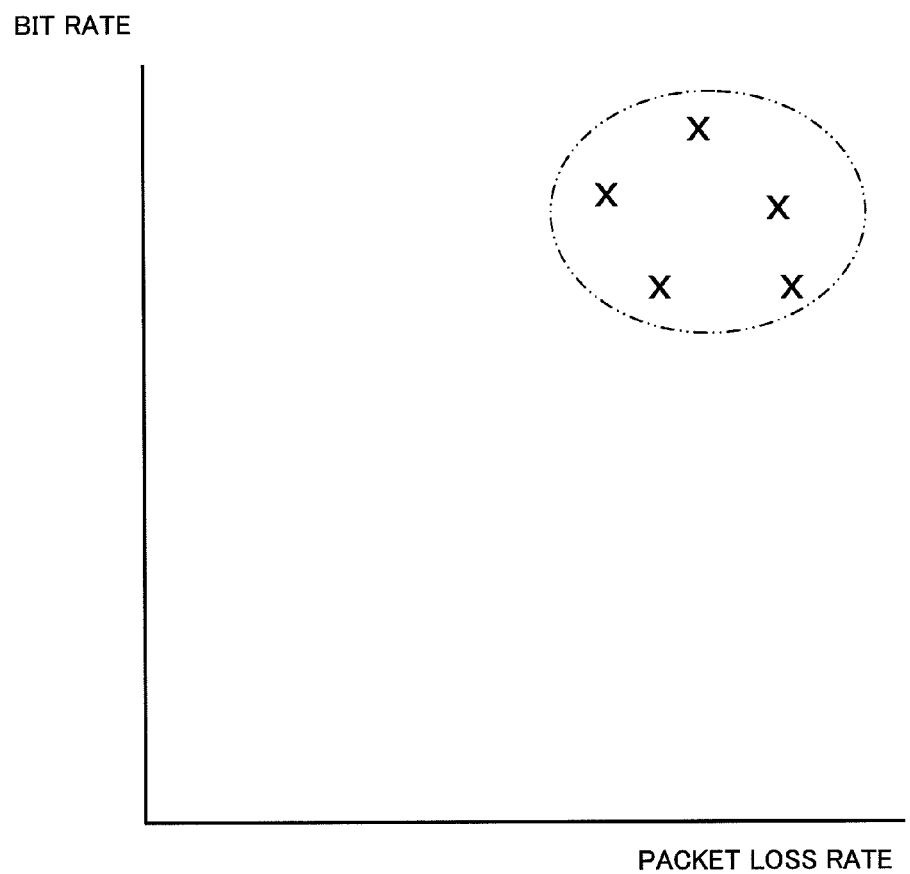
FIG. 6 shows an example of a relation between a transmission bit rate and a packet loss rate.

FIG. 4 and FIG. 5 are flowcharts each of which shows an operation of the moving image quality control unit 105 according to the first modified example of the first exemplary embodiment. The moving image quality control unit 105 starts the operation (Step S801). The moving image quality control unit 105 determines whether variance of the transmission bit rate and variance of the packet loss rate are not larger than predetermined threshold values respectively (Step S802). In the case that the variance of the transmission bit rate and the variance of the packet loss rate are not larger than the predetermined threshold values respectively ("Yes" in Step S802), the moving image quality control unit 105 determines that the network 113 and the network 114 are in stable states respectively. In this case, the moving image quality control unit 105 determines that there is no problem in maintaining the current state. Next, the moving image quality control unit 105 determines whether the maximum packet loss rate is not larger than a predetermined threshold value (Step S803). In the case that the maximum packet loss rate is not larger than the predetermined threshold value ("Yes" in Step S803), the moving image quality control unit 105 determines that there is no problem in the current states of the network 113 and the network 114. Then, the moving image quality control unit 105 determines that the current transmission bit rate, the current redundancy of FEC, and the current transmission bit rate of the moving image are the transmission bit rate, the redundancy of FEC, and the encode bit rate of the moving image which are to be applied after the control respectively (Step S804). Specifically, the moving image quality control unit 105 determines that the current redundancy of FEC is the redundancy of FEC which is to be applied after the control (Step S804-1). The moving image quality control unit 105 determines that the current transmission bit rate is the transmission bit rate which is to be applied after the control (Step S804-2). The moving image quality control unit 105 determines that the current transmission bit rate of the moving image is the encode bit rate of the moving image which is to be applied after the control (Step S804-3). Here, this state is corresponding to a state that the variance of the transmission bit rate and the variance of the packet loss rate are small respectively (not larger than the threshold value). Then, the moving image quality control unit 105 ends the operation (Step S811).

Figure 7:
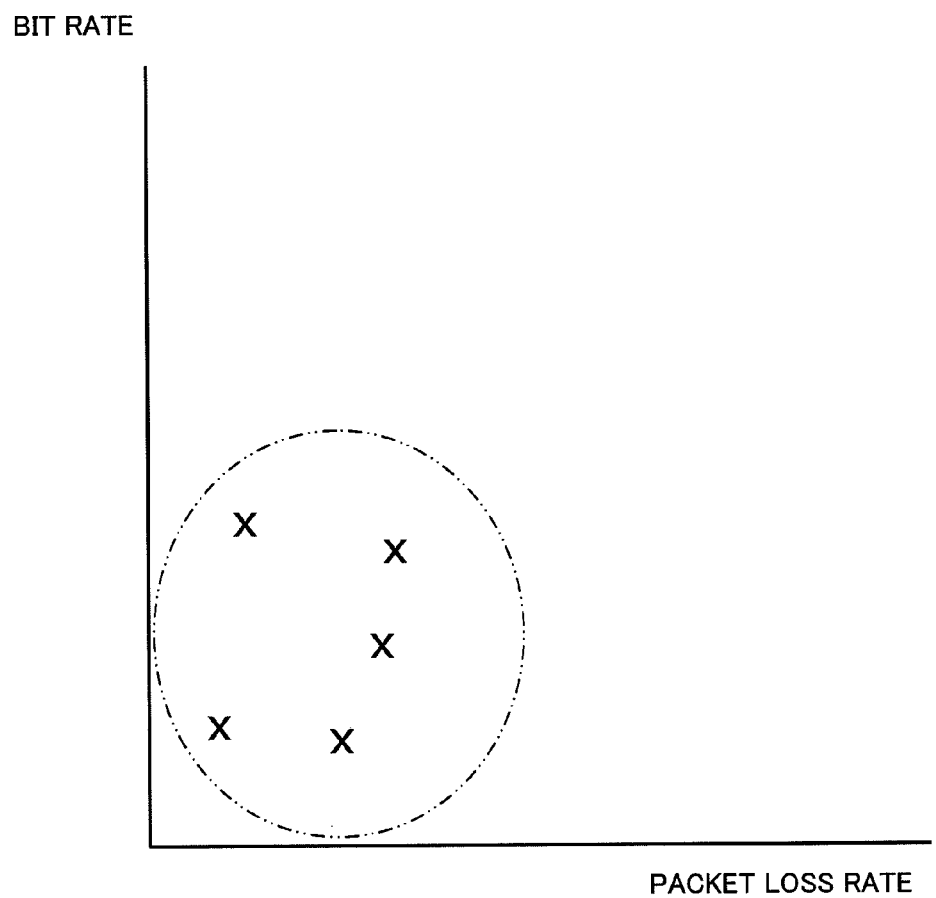
FIG. 7 shows an example of the relation between the transmission bit rate and the packet loss rate.

In the case that the maximum packet loss rate is larger than the predetermined threshold value ("No" in Step S803), the moving image quality control unit 105 determines that the network 113 and the network 114 are currently in unstable states respectively. Then, the moving image quality control unit 105 determines that the redundancy of FEC, which can restore the moving image data even if the packet loss rate is a maximum, is the redundancy of FEC which is to be applied after the control (Step S805-1). Moreover, the moving image quality control unit 105 determines that the current transmission bit rate is the transmission bit rate which is to be applied after the control (Step S805-2). On the basis of the redundancy of FEC and the transmission bit rate which are to be applied after the control, the moving image quality control unit 105 determines the encode bit rate of the moving image which is to be applied after the control (Step S805-3). A combination of Step S805-1 to Step S805-3 is defined as Step S805. Here, the state is corresponding to a state that both of the variance of the transmission bit rate and the variance of the packet loss are large (not smaller than threshold value), as shown in FIG. 7. Then, the moving image quality control unit 105 ends the operation (Step S811).

Figure 8:
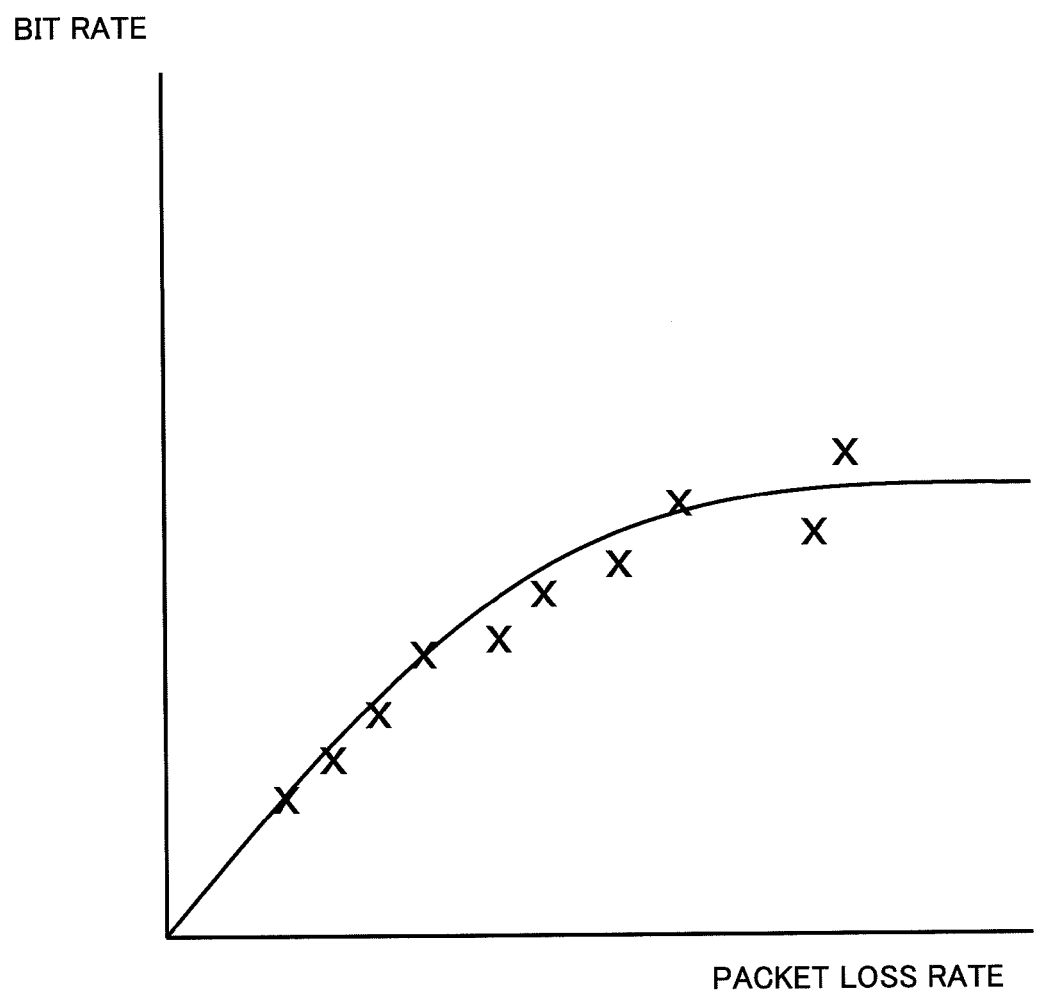
FIG. 8 shows an example of the relation between the transmission bit rate and the packet loss rate.

In the case that any one of the variance of the transmission bit rate and the variance of the packet loss rate is larger than the predetermined threshold value ("No" in Step S802), the moving image quality control unit 105 determines whether a positive correlation relation between the transmission bit rate and the packet loss rate exists (Step S806). In the case that the positive correlation relation between the transmission bit rate and the packet loss rate exists ("Yes" in Step S806), the moving image quality control unit 105 determines that the packet loss is caused due to own communication. In this case, the moving image transmission apparatus 101 can transmit the moving image with the best quality through the moving image quality control unit 105 carrying out the quality control which is described in the first exemplary embodiment of the present invention. The moving image quality control unit 105 carries out the operations of Step S206 and Step S207 according to the first exemplary embodiment (Step S807-1 and Step S807-2). Then, the moving image quality control unit 105 determines the transmission bit rate, the redundancy of FEC, and the encode bit rate of the moving image, which are to be applied after the control, by carrying out the above mentioned steps (Step S807). Here, the state is corresponding to a state that the transmission bit rate and the packet loss rate are in a state shown in FIG. 8. Then, the moving image quality control unit 105 ends the operation (Step S811).

Figure 9:
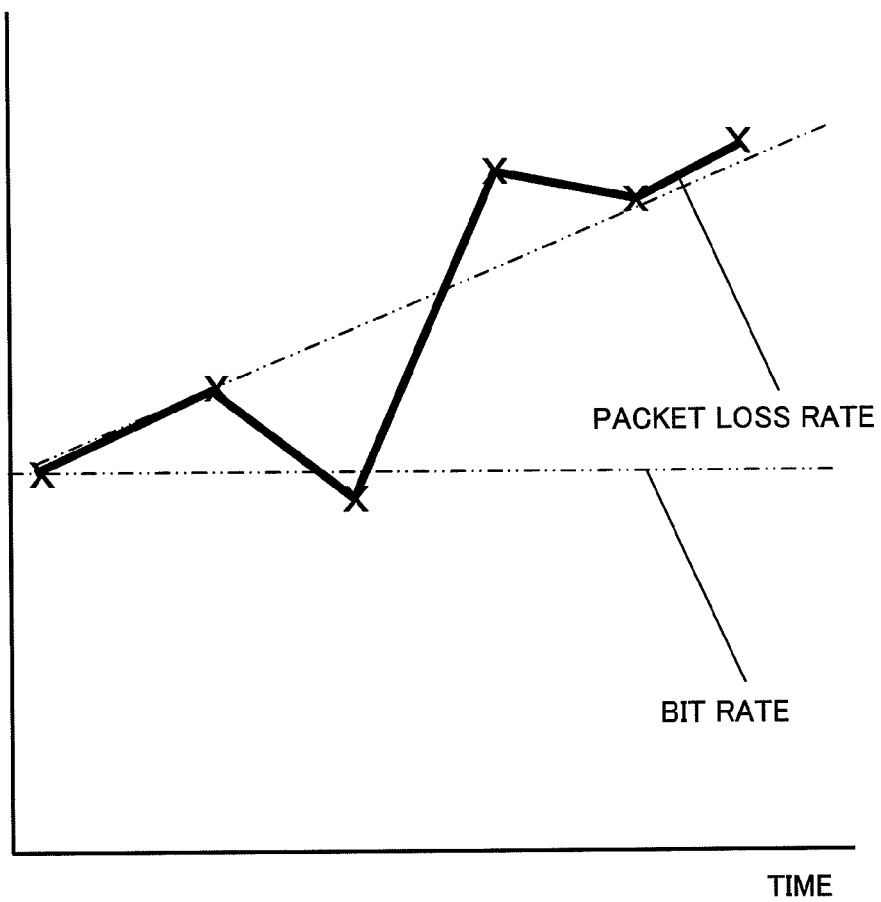
FIG. 9 shows an example of the relation between the transmission bit rate and the packet loss rate.

In the case that the positive correlation relation between the transmission bit rate and the packet loss rate does not exist ("No" in Step S806), the moving image quality control unit 105 determines whether a correlation relation between the time and the packet loss rate exists (Step S808). In the case that the correlation relation between the time and the packet loss rate exists ("Yes" in Step S808), the moving image quality control unit 105 determines that other communication influences the packet loss. Then, the moving image quality control unit 105 determines a correlation formula between the time and the packet loss rate, and estimates the packet loss rate which is caused after elapse of a predetermined time (Step S809-1). On the basis of the estimated packet loss rate and the first correlation formula, the moving image quality control unit 105 determines the transmission bit rate which is to be applied after the control (Step S809-2). Then, the moving image quality control unit 105 determines that the redundancy of FEC, which can restore the moving image data even in the case of the estimated packet loss rate, is the redundancy of FEC which is to be applied after the control (Step S809-3). Furthermore, on the basis of the redundancy of FEC and the transmission bit rate which are to be applied after the control, the moving image quality control unit 105 determines the encode bit rate of the moving image which is to be applied after the control (Step S809-4). A combination of Step S809-1 to Step S809-4 is defined as Step S809. Here, the state is corresponding to a state that the transmission bit rate and the packet loss rate are in a state shown in FIG. 9. Then, the moving image quality control unit 105 ends the operation (Step S811).

Figure 10:
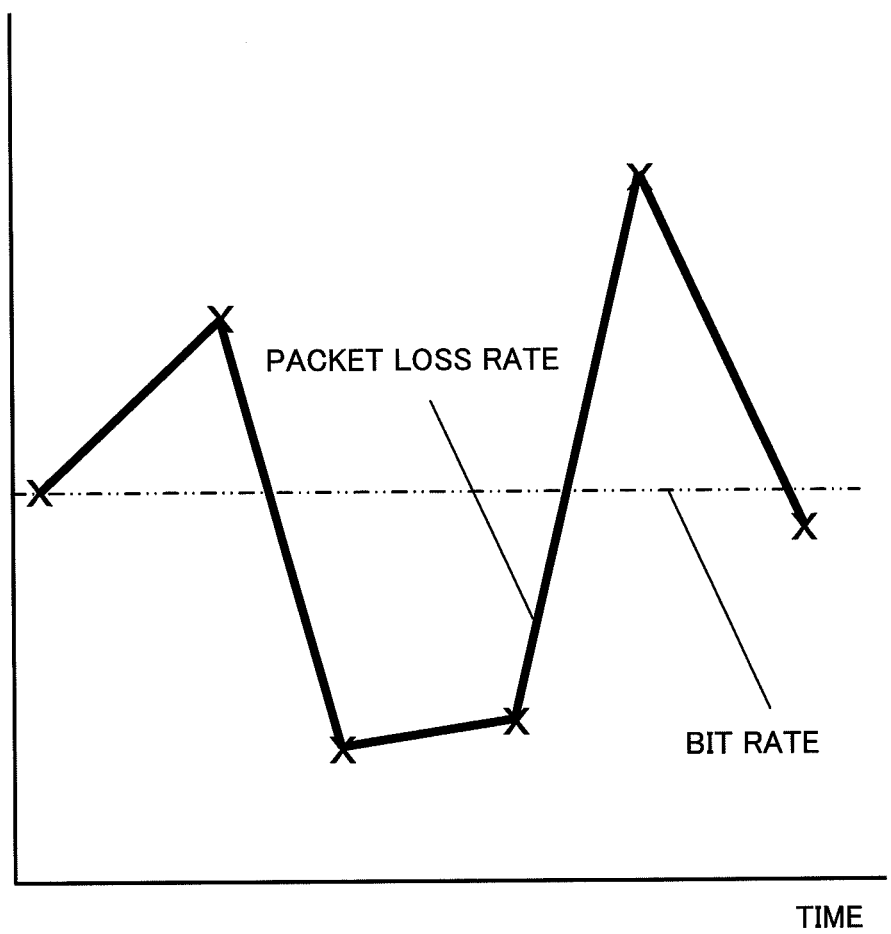
FIG. 10 shows an example of the relation between the transmission bit rate and the packet loss rate.

In the case that the correlation relation between the time and the packet loss rate does not exist ("No" in Step S808), the moving image quality control unit 105 determines that it is impossible to estimate the situation that the packet loss is caused. In this case, the moving image quality control unit 105 does not carry out the control. The moving image quality control unit 105 determines that the current transmission bit rate, the current redundancy of FEC, and the current transmission bit rate of the moving image are the transmission bit rate, the redundancy of FEC, and the encode bit rate of the moving image which are to be applied after the control respectively (Step S810). Specifically, the moving image quality control unit 105 determines that the current redundancy of FEC is the redundancy of FEC which is to be applied after the control (Step S810-1). The moving image quality control unit 105 determines that the current transmission bit rate is the transmission bit rate which is to be applied after the control (Step S810-2). The moving image quality control unit 105 determines that the current transmission bit rate of the moving image is the encode bit rate of the moving image which is to be applied after the control (Step S810-3). Here, the state is corresponding to a state that the transmission bit rate and the packet loss rate are in a state shown in FIG. 10. Then, the moving image quality control unit 105 ends the operation (Step S811).

Note, that according to the flowchart mentioned above, the moving image quality control unit 105 determines the transmission bit rate, the redundancy of FEC, and the transmission bit rate of the moving image, which are to be applied after the control, by use of one method on the basis of the transmission bit rate and the packet loss. The moving image quality control unit 105 may determine the transmission bit rate, the redundancy of FEC, and the transmission bit rate of the moving image, which are to be applied after the control, by use of a plurality of methods on the basis of the transmission bit rate and the packet loss. Then, the moving image quality control unit 105 may multiply values, which are determined by use of a plurality of the methods, by weighting coefficients respectively, and determines that an average of the multiplied values is a desired value.

For example, the moving image quality control unit 105 may determine the transmission bit rate in a way described in the following. The transmission bit rate which is determined in Step S805 mentioned above is denoted as B5, and the transmission bit rate which is determined in Step S807 mentioned above is denoted as B7, and the transmission bit rate which is determined in Step S809 mentioned above is denoted as B9. In this case, the moving image quality control unit 105 may determine a transmission bit rate B on the basis of [formula 1] described in the following. Here, each of α1, α2 and α3 is a predetermined real number.

$$B = B_5 \times \alpha_1 + B_7 \times \alpha_2 + B_9 \times \alpha_3 \quad \text{[Formula 1]}$$

where α1, α2 and α3 may be values determined in advance or may be values determined by learning. Moreover, α1, α2 and α3 may be determined on the basis of the situation that the packet loss is caused. The situation that the packet loss is caused is estimated by the moving image quality control unit 105.

According to the first modified example of the first exemplary embodiment, the moving image transmission system 1 determines the correlation relation between the transmission bit rate and the packet loss rate of the data. Then, on the basis of the determined correlation relation between the transmission bit rate and the packet loss rate, the moving image transmission system 1 estimates the situation that the packet loss is caused. Therefore, according to the moving image transmission system 1, it is possible to obtain a remarkable effect that the moving image transmission system 1 determines the adequate number of the packets, which carry the redundant data, on the basis of the correlation relation between the packet loss rate which indicates the states of the network 113 and the network 114, and the transmission bit rate of the data.

Second Exemplary Embodiment

Figure 11:
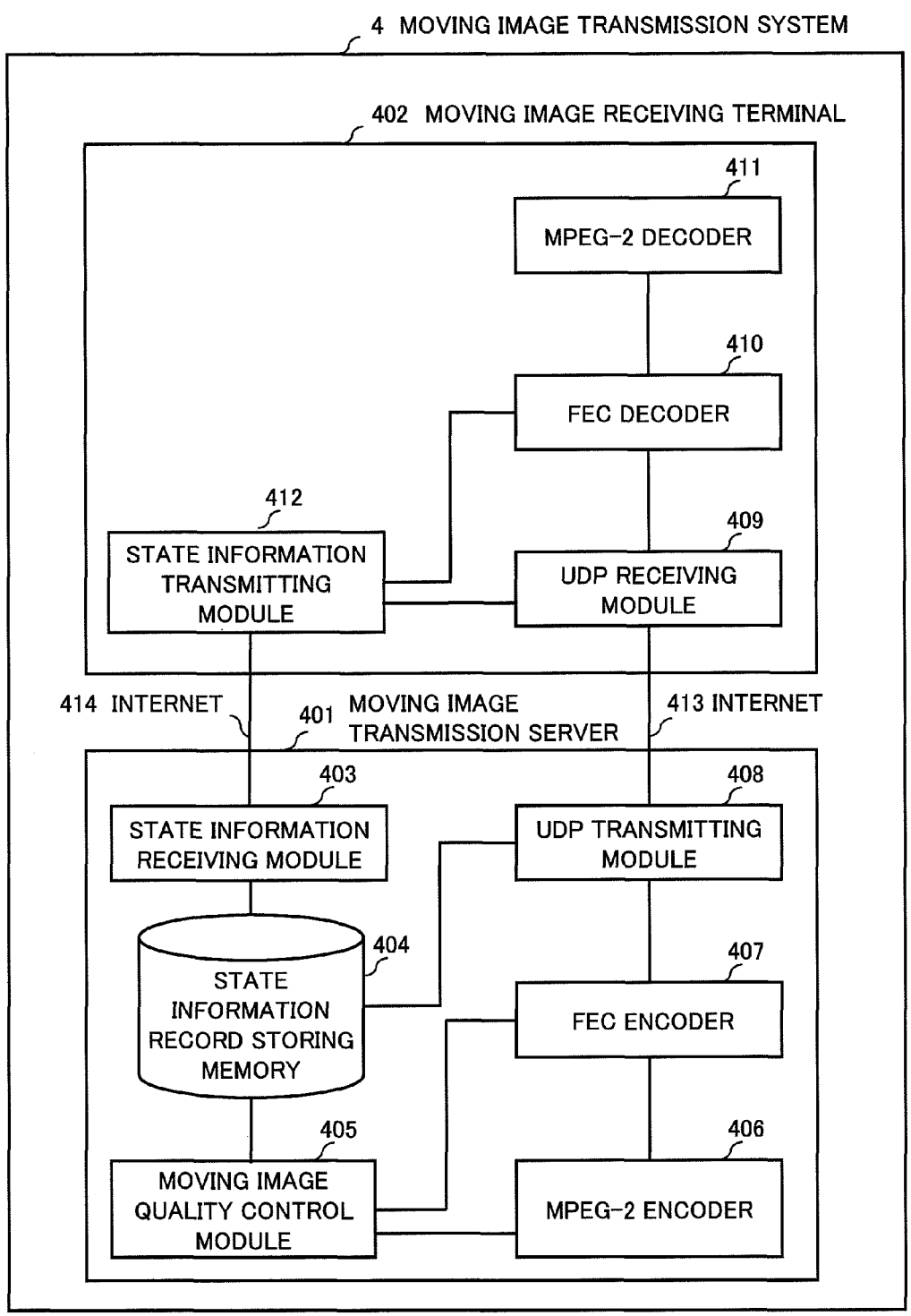
FIG. 11 is a block diagram showing a configuration according to a second exemplary embodiment of the present invention.

FIG. 11 is a block diagram showing an exemplary configuration of a moving image transmission system 4 according to a second exemplary embodiment of the present invention.

The moving image transmission system 4 includes a moving image transmission server 401 and a moving image receiving terminal 402. The moving image transmission server 401 and the moving image receiving terminal 402 are connected each other via the internet 413 and the internet 414. Only a different point of the second exemplary embodiment from the first exemplary embodiment will be focused and described hereinafter. A component according to the second exemplary embodiment, which has the same configuration as the component according to the first exemplary embodiment has, is assigned the same numeral number as the component according to the first exemplary embodiment is assigned, and description on the component is omitted.

The moving image transmission server 401 includes a state information receiving module 403, a state information record storing memory 404, a moving image quality control module 405, a MPEG-2 encoder 406, a FEC encoder 407 and an UDP transmitting module 408.

The moving image receiving terminal 402 includes an UDP receiving module 409, a FEC decoder 410, a MPEG-2 decoder 411 and a state information transmitting module 412.

It is assumed that the FEC encoder 407 and the FEC decoder 410 use the LDPC-FEC (Low Density Parity Check Forward Error Correction) method as the FEC method.

Figure 12:
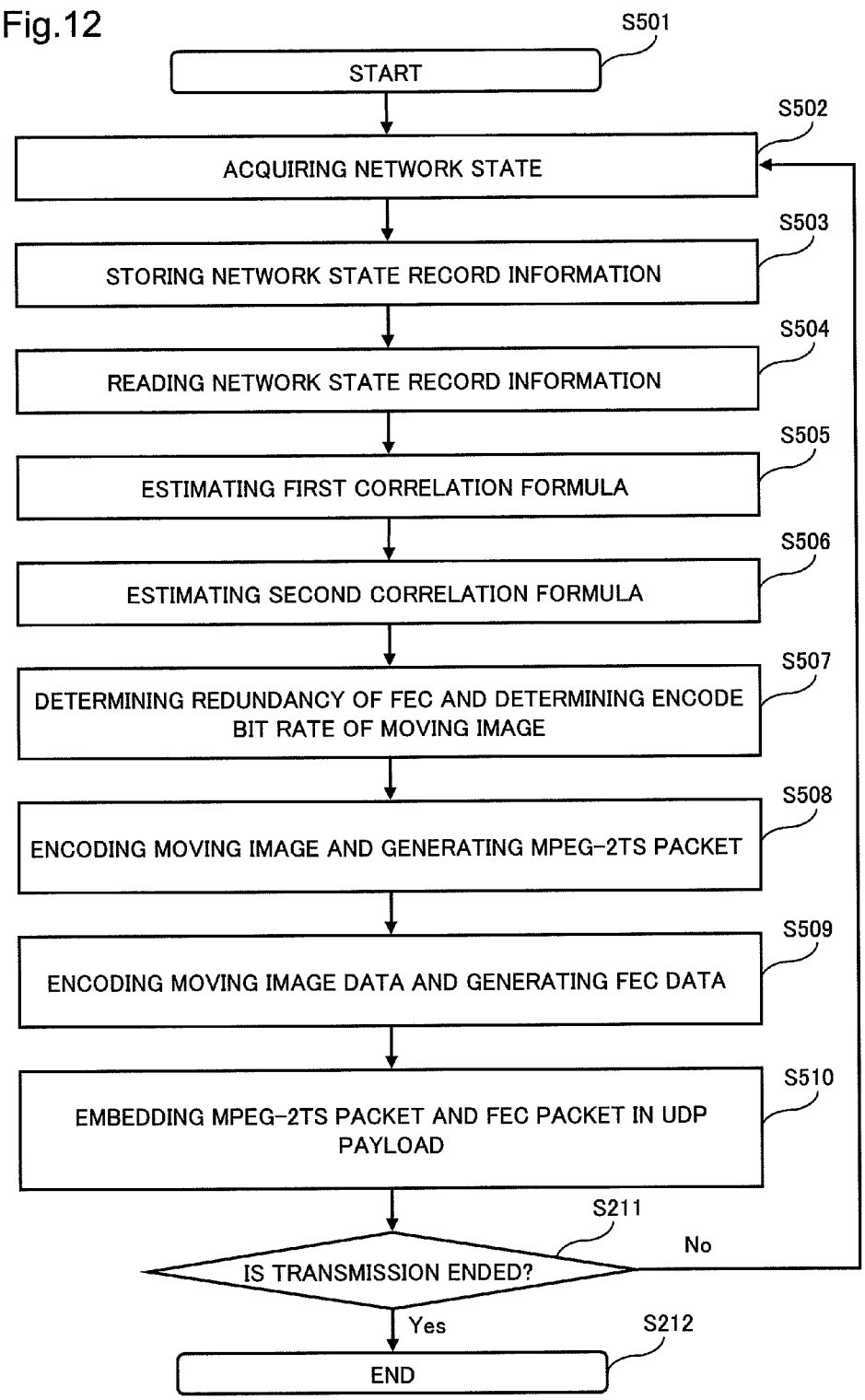
FIG. 12 is a flowchart exemplifying an operation of a moving image transmission server 401 according to the second exemplary embodiment of the present invention.

FIG. 12 is a sequence diagram showing an outline of operations of the moving image transmission server 401 according to the second exemplary embodiment of the present invention.

The moving image transmission server 401 starts the operation (Step S501). The state information receiving module 403 acquires network state information on the internet 413 via the internet 414 (Step S502). It is assumed that the network state information includes a time stamp value which indicates a time when each packet is transmitted by the moving image transmission server 401, a cyclic counter value, information which indicates a packet loss rate caused before FEC decoding, and information which indicates the packet loss rate after the FEC decoding. On the basis of the time stamp value which is included in the received network state information, the state information receiving module 403 reads transmission bit rate information of a moving image, which is generated at a time corresponding to the time stamp value, from the state information record storing memory 404. Then, the state information receiving module 403 makes the state information record storing memory 404 store network state record information (Step S503). The network state record information includes the network state information which the state information receiving module 403 receives, and a transmission bit rate which is included in the read transmission bit rate information. The transmission bit rate information is stored by the state information record storing memory 404 in Step S507 which is the past step.

The moving image quality control module 405 reads the network state record information from the state information record storing memory 404 (Step S504). The moving image quality control module 405 calculates a correlation between the transmission bit rate and the packet loss rate, which are recorded within a fixed period of time, on the basis of the network state record information which is read, and expresses the calculation result as the first correlation formula (Step S505). It is assumed that the state information record storing memory 404 stores the network state record information which is acquired every almost one second. Moreover, it is assumed that the moving image quality control module 405 reads five past records. Number of the records and the method for acquiring the record are merely for an exemplified configuration in this embodiment. The acquisition interval may be more lengthened. Moreover, the moving image quality control module 405 may multiply information of the record which is acquired at a short interval and information of the record which is acquired at a long interval by weighting coefficients respectively, and uses a combination of both the weighted information.

Here, the packet loss rate is denoted as x and the transmission bit rate is denoted as y. It is possible to estimate that the first correlation formula is expressed, for example, by an approximate formula shown in FIG. 13 on the basis of the five record data by use of the minimum square error method. A form of this graph indicates the following. That is, FIG. 13 shows that, in the case that the transmission bit rate becomes large to some extent, an available bandwidth decreases and the packet loss rate increases.

Figure 13:
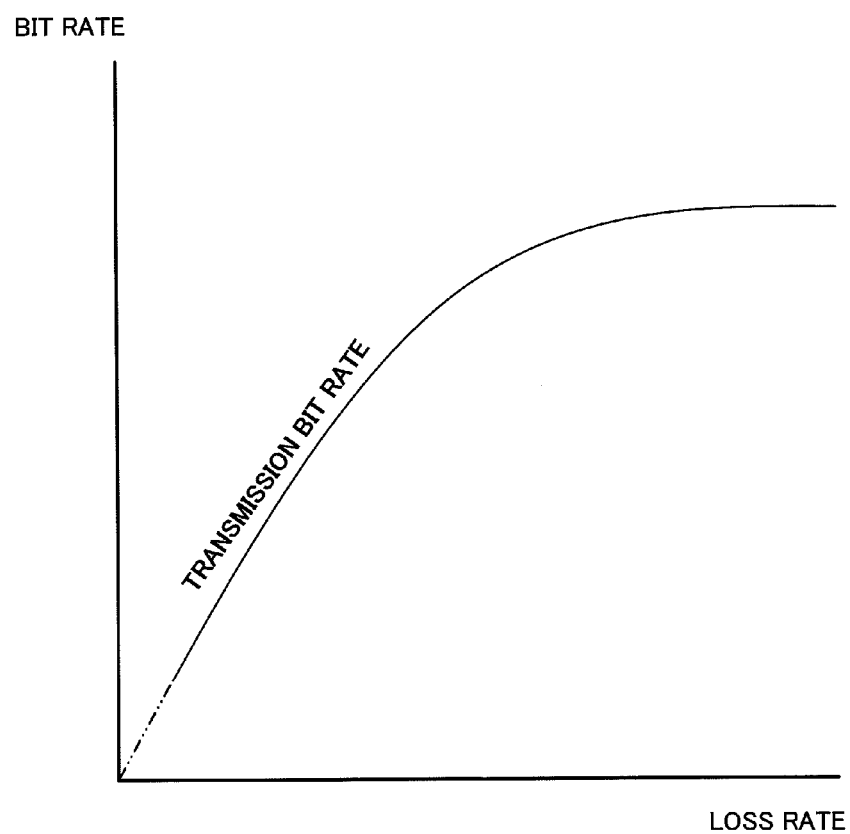
FIG. 13 shows an example of a first correlation formula.

For example, in the case that the approximate formula shown in FIG. 13 is approximated by a first order formula of x, it is estimated that the first correlation formula is expressed as an approximate formula $y=ax+b$ (a and b are fixed numbers calculated with the minimum square error method). Moreover, in the case that the approximate formula shown in FIG. 13 is expressed by use of logarithm of x, it is estimated that the first correlation formula is expressed as an approximate formula $y=a*(\log x)+b$ (a and b are fixed numbers calculated with the minimum square error method). Moreover, in the case that the approximate formula shown in FIG. 13 is expressed by use of a reciprocal of x, it is estimated that the first correlation formula is expressed as an approximate formula $y=a(1-b/x)+b$ (a and b are fixed numbers calculated with the minimum square error method).

The moving image quality control module 405 determines an encode bit rate of the moving image, which the moving image quality control module 405 transmits, on the basis of the transmission bit rate which is determined by the calculated first correlation formula (Step S506). The moving image quality control module 405 determines the encode bit rate of the moving image on the basis of the determined transmission bit rate, a header size of the moving image data at the transmission bit rate, and a data size of the FEC data. Specifically, the moving image quality control module 405 determines the encode bit rate of the moving image by subtracting a bit rate which is corresponding to the data size of the header, and a bit rate which is corresponding to the data size of the FEC data from the transmission bit rate. It is assumed that the transport layer of MPEG-2 (Moving Picture Experts Group 2), which is used as the format of the moving image, is MPEG-2 TS (Transport Stream) in order to mix and transmit a moving picture and a voice. In this case, an amount of the header data is coincident with a total amount of the IP (Internet Protocol) header data, the UDP (User Datagram Protocol) header data and the MPEG-2 TS header data. In this case, an amount of the FEC data is coincident with a total amount of payload data of the cyclic FEC packet which has sufficient redundancy against the targeted packet loss rate, and the FEC header data.

Figure 14:
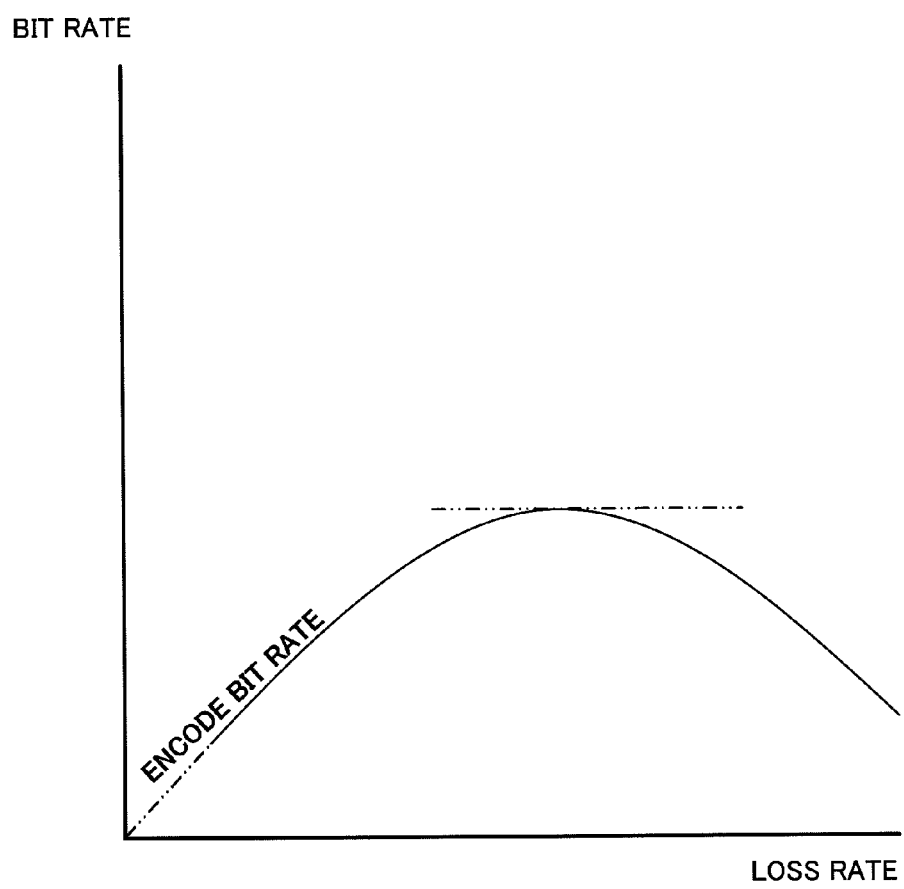
FIG. 14 shows an example of a second correlation formula.

The moving image quality control module 405 estimate a second correlation formula, which indicates a correlation relation between the encode bit rate and the packet loss rate of the moving image, on the basis of the determined encode bit rate and the determined first correlation formula of the moving image. For example, it can be estimated that the second correlation formula is expressed as an approximate formula shown in FIG. 14 by use of the minimum square error method. A form of this graph means the following. That is, FIG. 14 shows that the transmission bit rate becomes the largest if the packet loss rate is coincident with a predetermined packet loss rate (packet loss rate which makes an inclination of the second correlation formula zero). The form of the graph shown in FIG. 14 means that the encode bit rate become decreasing since the redundant code occupies a large part of the moving image data if the packet loss rate become not smaller than a predetermined value.

For example, in the case that the second correlation formula is approximated by a second order formula $y=ax*x+bx+c$ ($x*x$ means square of x), the packet loss rate, which is corresponding to a peak point of the second order formula, makes an inclination of the correlation formula zero. The packet loss rate, which makes the inclination of the correlation formula zero, makes the encode bit rate maximum. The moving image quality control module 405 determines the encode bit rate at which the moving image data transmitted on the basis of the maximized encode bit rate by the moving image transmission server 401 is encoded. By use of the second correlation formula, the moving image quality control module 405 determines the packet loss rate which is estimated in the case that the determined encode bit rate of the moving image data is used. Then, the moving image quality control module 405 determines the redundancy of FEC which can restore the data even in the case that the estimated packet loss rate is caused. The moving image quality control module 405 makes the state information record storing memory 404 record the transmission bit rate, which is determined on the basis of the redundancy of FEC, together with information indicating a time when data is transmitted at the transmission bit rate (Step S507).

The MPEG-2 encoder 406 encodes the moving image at the encode bit rate which is determined in Step S507 and generates a MPEG-2 TS packet (Step S508).

The FEC encoder 407 generates a FEC packet by use of the redundancy of FEC, which is determined in Step S507, on the basis of the MPEG-2 TS packet which is generated by the MPEG-2 encoder 406 (Step S509). Moreover, the network state information which the state information receiving module 404 receives may include information indicating an amount of data, which can not be restored even by use of FEC, in some cases. In the case, the moving image quality control module 405 determines that the continuously-lost packets whose length is longer than an estimated length are caused in the internet 413. Then, in order to select an algorithm which has robustness against more continuous packet losses, the moving image quality control module 405 makes a cyclic period of FEC lengthened and increases number of FEC streams. The cyclic period of FEC means number of the packets (frame length) of source data to which the redundant code is added. The number of the FEC streams means number of the cyclic periods in the case that a plurality of redundant codes are used at a plurality of the cyclic periods of FEC.

For example, in the case that the moving image quality control module 405 carries out the FEC encoding currently with using two cyclic periods of FEC, the moving image quality control module 405 may carry out the FEC encoding with using three cyclic periods of FEC. Moreover, the moving image quality control module 405 may change two cyclic periods to a set of the cyclic periods which are lengthened.

The UDP transmitting module 408 transmits the MPEG-2 TS packet which is generated in Step S508, and the FEC packet which is generated in Step S509 as an UDP packet via the internet 413 (Step S510).

In the case that the moving image transmission server 401 does not receive a request such as a transmission halting command from an user of the moving image receiving terminal 402, the moving image transmission server 401 repeats the same steps which start from Step S502 (Step S511). Moreover, in the case that the moving image transmission server 401 does not transmit up to an end of the moving image yet, the moving image transmission server 401 repeats the same steps which start from Step S502 (Step S511). In an else case, the moving image transmission server 401 ends the operation (Step S512). For example, in the case that the moving image transmission server 401 receives a request to jump to a specific playback position, the moving image transmission server 401 may not stop the operation (does not carry out the operation of Step S512), and changes a transmission position in the moving image data and starts transmitting the moving image data from the new transmission point. Then, the moving image transmission server 401 may carry out the operations, which follow Step S511, at a later time.

Figure 15:
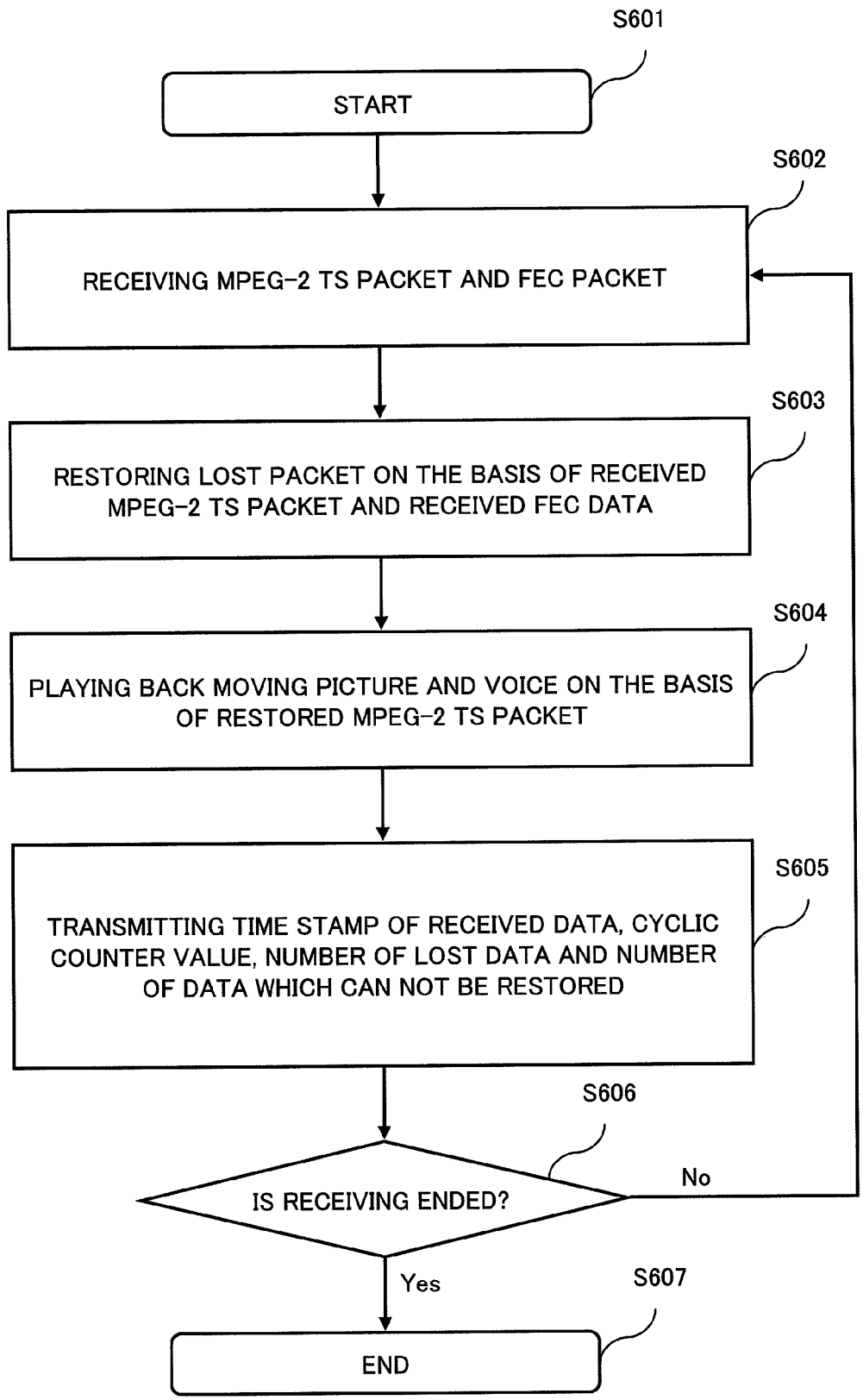
FIG. 15 is a flowchart exemplifying an operation of a moving image receiving terminal 402 according to the second exemplary embodiment of the present invention.

FIG. 15 is a sequence diagram showing an outline of operations of the moving image receiving terminal 402 according to the second exemplary embodiment of the present invention.

The moving image receiving terminal 402 starts the operation (Step S601). Then, the UDP receiving module 409 receives the MPEG-2 TS packet and the FEC packet via the internet 413. At this time, the UDP receiving module 409 notifies the state information transmitting module 412 of the time stamp value of the received packet, the cyclic counter value of the received packet and number of packets which are lost when the moving image receiving terminal 402 receives the packets (Step S602).

If there is the lost packet, the FEC decoder 410 restores the lost packet, and re-generates the MPEG-2 TS packet, which is not caused the lost packet yet, on the basis of the MPEG-2 TS packet and the FEC packet which the UDP receiving module 409 receives in Step S602 (Step S603). Moreover, the FEC decoder 410 notifies the state information transmitting module 412 of the number of packets which can not be restored even by use of FEC.

The MPEG-2 decoder 411 decodes the MPEG-2 TS packet which is restored in Step S603, and plays back the moving picture and the voice (Step S604).

The state information transmitting module 412 transmits the network status information outward via the internet 414 every almost one second by use of a timer (Step S605). The network state information includes the time stamp value of the last packet of the received data out of the packets which are received within a period of time measured by the timer, the cyclic counter value and number of the packets which are lost within the period of time.

If another moving image to be received still continues, the moving image receiving terminal 402 repeats the same steps which start from Step S602 (Step S606). If another moving image to be received continues no longer, the moving image receiving terminal 402 ends the operation (Step S607).

Note, that the network, which is denoted as the internet according to the first exemplary embodiment, may be a cellular phone network (3G, 3.5G, 3.9G, 4G or the like), or the intranet. The communication packet may be a RTP (Real-time Transport Protocol) packet or a packet, to which another transport protocol is applied, instead of the MPEG-2 TS packet. Formats of the moving picture and the voice have no restriction in particular. Any kind of the format such as MPEG-4, H.263, H.264 or the like may be applicable in addition to MPEG-2, and furthermore the formats of the moving picture and the voice based on the non-standardized original coding method may be also applicable. The format of the voice has no restriction in particular. Any kind of the format of the voice such as AAC (Advanced Audio Coding), G.711, G.722 or the like may be applicable. Moreover, any kind of the terminal such as a cellular phone, STB (Set Top Box), TV (Television), PC (Personal Computer) or the like may be applicable.

According to the second exemplary embodiment, the moving image transmission system 4 determines the packet loss rate, which makes the encode bit rate of the moving image maximum, on the basis of the correlation relation between the transmission bit rate and the packet loss rate of the data. Then, the moving image transmission system 4 determines the redundancy of the redundant code on the basis of the determined packet loss rate. Therefore, according to the moving image transmission system 4, it is possible to obtain a remarkable effect that the moving image transmission system 4 is possible to determine adequate number of the packets, which carry the redundant data, on the basis of the correlation relation between the packet loss rate which indicates the states of the internet 413 and the internet 114, and the transmission bit rate of the data.

Description of Modified Example of Exemplary Embodiment

A modified example of the second exemplary embodiment will be described in the following.

Figure 16:
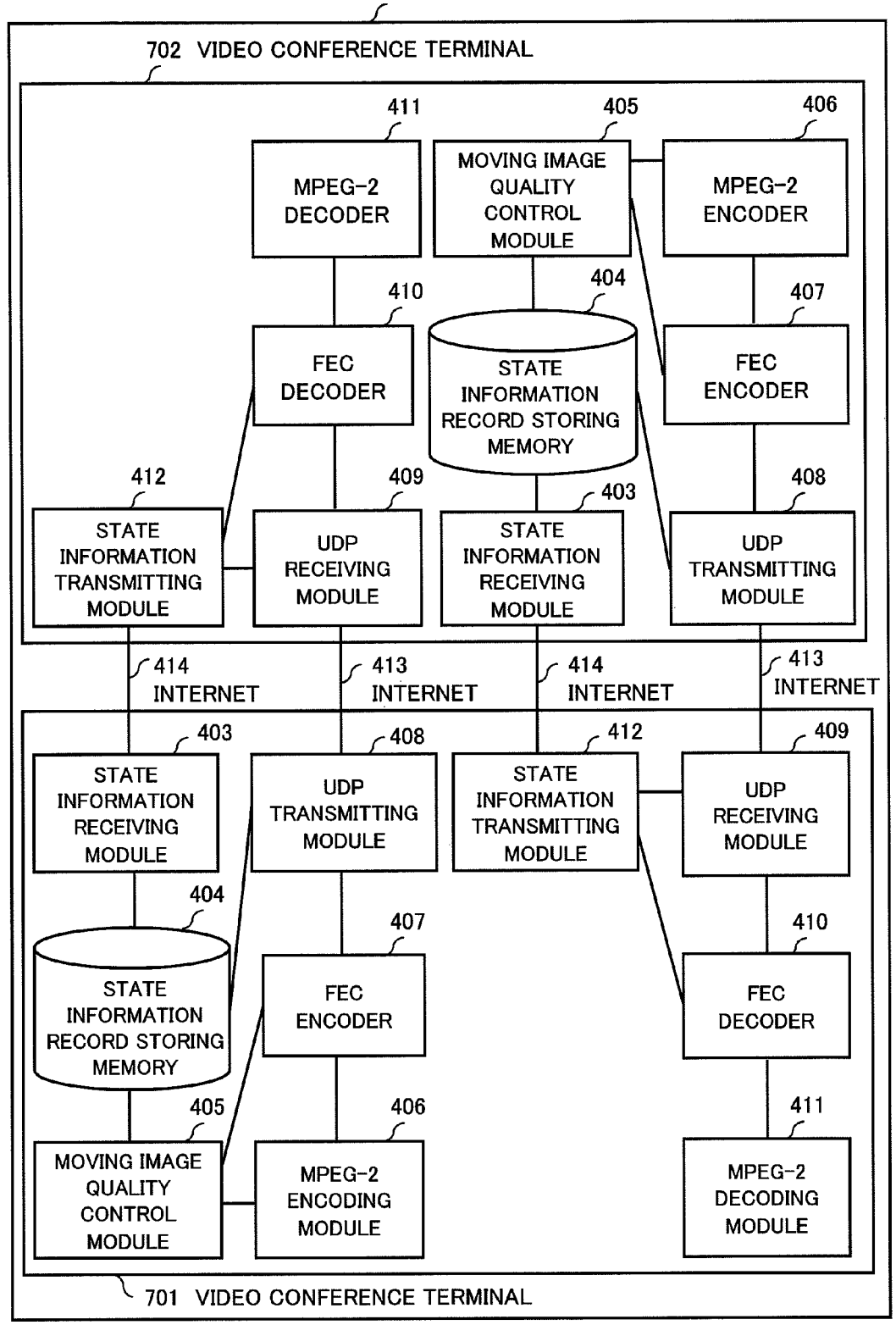
FIG. 16 is a block diagram showing a modified example of the second exemplary embodiment of the present invention.

FIG. 16 is a block diagram showing an exemplary configuration of a moving image transmission system 7 according to the modified example of the second exemplary embodiment of the present invention.

The basic configuration of the moving image transmission system 7 shown in FIG. 16 is the same as one of the moving image transmission system 4 shown in FIG. 11. A video conference terminal 701 and a video conference terminal 702, which are included in the moving image transmission system 7 shown in FIG. 16, have also the function of the moving image transmission server 401 and the function of the moving image receiving terminal 402 shown in FIG. 16 respectively.

An operation of the moving image transmission system 7 is similar to the operation of the moving image transmission system 4 according to the second exemplary embodiment except that each apparatus shown in FIG. 16 has the transmitting and receiving function.

Third Exemplary Embodiment

Figure 17:
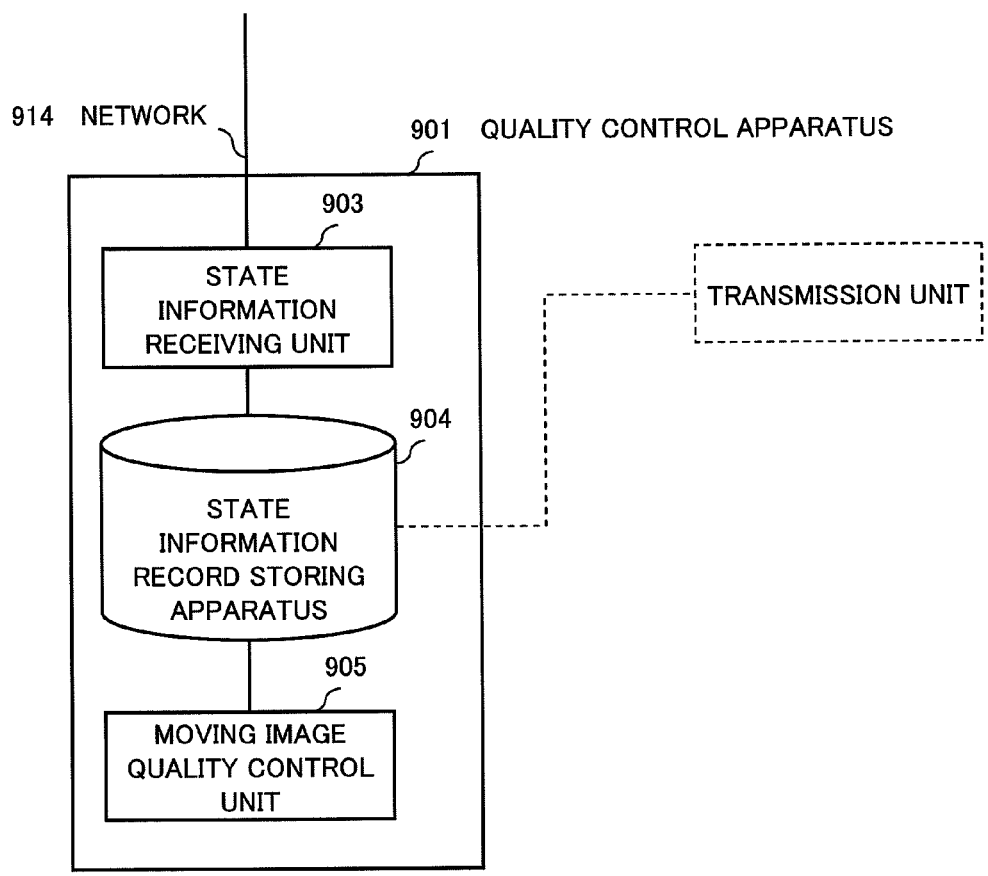
FIG. 17 is a block diagram showing a configuration according to a third exemplary embodiment of the present invention.

FIG. 17 is a block diagram showing an exemplary configuration of a quality control apparatus 901 according to a third exemplary embodiment of the present invention.

The quality control apparatus 901 includes a state information receiving unit 903, a state information record storing unit 904 and a moving image quality control unit 905.

The quality control apparatus 901 is connected with the outside via a network 914.

From the network 914, the state information receiving unit 903 receives network state information including both of information which indicates a packet of a moving image data, and information which indicates a packet loss rate of the moving image data. Here, the information which indicates the packet of the moving image data, and information which indicates the packet loss rate of the moving image data are transmitted by a transmission unit which transmits the moving image data at a predetermined transmission bit rate.

The state information record storing unit 904 stores bit rate information, which includes the transmission bit rate of the moving image data transmitted by the transmission unit, in association with the network state information which the state information receiving unit 903 receives.

Firstly, the moving image quality control unit 905 reads the information which indicates the packet loss rate of the packet transmitted by the transmission unit, and the bit rate information of the packet from the state information record storing unit 904. Secondly, the moving image quality control unit 905 estimates a correlation between an encode bit rate and the packet loss rate of the moving image data on the basis of these read information. Thirdly, the moving image quality control unit 905 determines the packet loss rate, which makes the encode bit rate of the moving image data maximum, on the basis of the estimated correlation. Fourthly, the moving image quality control unit 905 determines redundancy, which is applied to the moving image data, on the basis of the determined packet loss rate.

The quality control apparatus 901 shown in FIG. 17 carries out the same operation as the moving image transmission apparatus 101 according to the first exemplary embodiment of the present invention carries out. The quality control apparatus 901 determines the packet loss rate, which makes the encode bit rate of the moving image data maximum, on the basis of the correlation between the transmission bit rate and the packet loss rate of the data. Then, the quality control apparatus 901 determines redundancy of a redundant code on the basis of the determined packet loss rate. Therefore, the quality control apparatus 901 according to the third exemplary embodiment of the present invention, can obtain the same effect as the moving image transmission apparatus 101 according to the first exemplary embodiment of the present invention obtains.

While the invention of the present application has been described with reference to the exemplary embodiment and the example, the invention of the present application is not limited to the above-mentioned exemplary embodiment and the example. It is possible to make various changes, which a person skilled in the art can understand, in the form and details of the invention of the present application without departing from the sprit and scope of the invention of the present application.

This application is based upon and claims the benefit of priority from Japanese Patent Application No. 2009-266018, filed on Nov. 24, 2009, the disclosure of which is incorporated in its entirety by reference.

INDUSTRIAL APPLICABILITY

The moving image transmission apparatus according to the present invention can be applied to an application which uses the moving image and which is provided through an unstable network. For example, a video conference, a video phone, broadcast, VoD (Video on Demand), nPVR (network Personal Video Recorder) or the like is exemplified as the application which uses the moving image.

DESCRIPTION OF THE CODES 1 moving image transmission system
4 moving image transmission system
7 moving image transmission system
101 moving image transmission apparatus
102 moving image receiving apparatus
103 state information receiving unit
104 state information record storing apparatus
105 moving image quality control unit
106 moving image encoding unit
107 FEC encoding unit
108 data transmitting unit
109 data receiving unit
110 FEC decoding unit
111 moving image decoding unit
112 state information transmitting unit
113 network
114 network
401 moving image transmission server
402 moving image receiving terminal
403 State information receiving module
404 state information record storing memory
405 moving image quality control module
406 MPEG-2 encoder
407 FEC encoder
408 UDP transmitting module
409 UDP receiving module
410 FEC decoder
411 MPEG-2 decoder
412 state information transmitting module
413 internet
414 internet
701 video conference terminal
702 video conference terminal
901 quality control apparatus
903 state information receiving unit
904 state information record storing apparatus
905 moving image quality control unit
914 network

The invention claimed is:

1. A quality control apparatus, comprising:
a state information receiving unit to receive network state information which includes both of a packet loss rate of moving image data caused at a certain time and time information indicating the certain time;
a state information record storing apparatus to store bit rate information, which includes both of a transmission bit rate of the moving image data caused at a certain time and time information indicating the certain time, in association with the network state information which includes the time information;
a moving image quality control unit to read both of information indicating the packet loss rate which is associated with the time information included in each packet of the moving image data and the transmission bit rate from the state information record storing apparatus, and to estimate a correlation between an encode bit rate and the packet loss rate of the moving image data based on each of the read information, and to determine the packet loss rate, which makes the encode bit rate of the moving image data maximum based on the correlation, and to determine redundancy, which is applied to the moving image data based on the determined packet loss rate, wherein
the moving image quality control unit estimates a first correlation formula, which represents a correlation between the transmission bit rate and the packet loss rate, based on the information indicating the packet loss rate and the transmission bit rate which are read from the state information record storing device, and estimates a second correlation formula, which represents the correlation between the encode bit rate and the packet loss rate of the moving image data based on a difference between the transmission bit rate which is corresponding to the information indicating each the packet loss rate and which is determined by the first correlation formula and a transmission bit rate of a redundant code, which is used at a time indicated by the time information included in the bit rate information including the transmission bit rate corresponding to the information indicating each the packet loss rate and which is determined based on the packet of the moving image data, and determines the packet loss rate, which makes the encode bit rate of the moving image data maximum based on the second correlation formula, and determines the redundancy, which is applied to the moving image data, based on the determined packet loss rate.

2. The quality control apparatus according to claim 1, wherein
the moving image quality control unit adjusts the determined redundancy based on network bandwidth which the quality control apparatus uses.

3. The quality control apparatus according to claim 1, wherein
the moving image quality control unit adjusts the determined redundancy based on a difference between the transmission bit rate included in the bit rate information which includes the time information included in each the packet of the moving image data and a transmission bit rate which is determined based on the maximum encode bit rate and the determined redundancy of the data.

4. The quality control apparatus according to claim 1, wherein
based on a determination whether there is a correlation relation between the packet loss rate and the time information which are included in the network state information, the moving image quality control unit determines whether the redundancy applied to the moving image data is adjusted.

5. A quality control apparatus, comprising:
a state information receiving unit to receive network state information which includes both of a packet loss rate of moving image data caused at a certain time and time information indicating the certain time;
a state information record storing apparatus to store bit rate information, which includes both of a transmission bit rate of the moving image data caused at a certain time and time information indicating the certain time, in association with the network state information which includes the lime information,
a moving image quality control unit to read both of information indicating the packet loss rate which is associated with the time information included in each packet of the moving image data and the transmission bit rate from the state information record storing apparatus, and to estimate a correlation between an encode bit rate and the packet loss rate of the moving image data based on each of the read information, and to determine the packet loss rate, which makes the encode bit rate of the moving image data maximum based on the correlation, and to determine redundancy, which is applied to the moving image data based on the determined packet loss rate, wherein
the moving image quality control unit determines a transmission bit rate which exists between the transmission bit rate included in the bit rate information which includes the time information included in each the packet of the moving image data and the transmission bit rate which is determined based on the maximum encode bit rate and the determined redundancy of the data, and determines new redundancy based on the determined transmission bit rate and the maximum encode bit rate.

6. The quality control apparatus according to claim 5, wherein
after a predetermined period of time elapses, the moving image quality control unit adjusts the new redundancy so as to be coincident with redundancy which is determined based on the packet loss rate corresponding to the maximum encode bit rate.

7. A quality control apparatus, comprising:
a state information receiving unit to receive network state information which includes both of a packet loss rate of moving image data caused at a certain time and time information indicating the certain time;
a state information record storing apparatus to store bit rate information, which includes both of a transmission bit rate of the moving image data caused at a certain time and time information indicating the certain time, in association with the network state information which includes the time information;
a moving image quality control unit to read both information indicating the packet loss rate which is associated with the time information included in each packet of the moving image data and the transmission bit rate from the state information record storing apparatus, and to estimate a correlation between an encode hit rate and the packet loss rate of the moving image data based on each of the read information, and to determine the packet loss rate, which makes the encode bit rate of the moving image data maximum based on the correlation, and to determine redundancy, which is applied to the moving image data based on the determined packet loss rate
based on a determination whether at least one out of variance of the packet loss rate which is included in the network state information, variance of the transmission bit rate which is included in the bit rate information, and the maximum value of the packet loss rate is not larger than a predetermined threshold value, the moving image quality control unit determines whether the redundancy applied to the moving image data is adjusted.

8. A quality control apparatus, comprising:
a state information receiving unit to receive network state information which includes both of a packet loss rate of moving image data caused at a certain time and time information indicating the certain time,
a state information record storing apparatus to store bit rate information, which includes both of a transmission bit rate of the moving image data caused at a certain time and time information indicating the certain time, in association with the network state information which includes the time information;
a moving image quality control unit to read both of information indicating the packet loss rate which is associated with the time information included in each packet of the moving image data and the transmission bit rate from the state information record storing apparatus, and to estimate a correlation between an encode bit rate and the packet loss rate of the moving image data based on each of the read information, and to determine the packet loss rate, which makes the encode bit rate of the moving image data maximum based on the correlation, and to determine redundancy, which is applied to the moving image data based on the determined packet loss rate,
a redundant code encoding unit which adds a redundant code to the moving image data based on the redundancy which the moving image quality control unit determines or adjusts, wherein
the network state information includes information which indicates the packet loss rate caused after decoding and which is corresponding to a ratio of an amount of data unable to be decoded even if the redundant code decodes the moving image data to an amount of the moving image data, and
the redundant code encoding unit changes an algorithm, which generates the redundant code based on the information which indicates the packet loss rate caused after the decoding.

9. The quality control apparatus according to claim 8, comprising:
a moving image encoding unit to encode the moving image data based on the packet loss rate which the moving image quality control unit determines; and
a data transmitting unit to transmit the moving image data to which the redundant code encoding unit adds the redundant code, wherein
the moving image quality control unit makes the state information record storing apparatus store the bit rate information including both of the transmission bit rate which is determined based on the maximum encode bit rate of the moving image data and information which indicates a range of time when the moving image data is transmitted at the transmission bit rate.

10. A moving image transmission system, comprising:
a moving image transmission apparatus; and
a moving image receiving apparatus, wherein
the moving image transmission apparatus includes:
- a transmission unit to transmit moving image data at a predetermined transmission bit rate,
- a state information receiving unit to receive network state information which includes both of a packet loss rate of the moving image data caused at a certain time and time information indicating the certain time,
- a state information record storing apparatus to store bit rate information, which includes both of the transmission bit rate of the moving image data used at a certain time and time information indicating the certain time, in association with the network state information which includes the time information, and
- a moving image quality control unit to read both of the information indicating the packet loss rate which is associated with the time information included in each packet of the moving image data and the transmission bit rate from the state information record storing apparatus, and to estimate a correlation between an encode bit rate and the packet loss rate of the moving image data base on each of the read information, and to determine the packet loss rate, which makes the encode bit rate of the moving image data maximum based on the correlation, and to determine redundancy, which is applied to the moving image data based on the determined packet loss rate,
wherein the moving image quality control unit estimates a first correlation formula, which represents a correlation between the transmission bit rate and the packet loss rate, based on the information indicating the packet loss rate and the transmission bit rate which are read from the state information, record storing apparatus, and estimates a second correlation formula, which represents the correlation between the encode bit rate and the packet loss rate of the moving image data based on a difference between the transmission bit rate which is corresponding to the information indicating each the packet loss rate and which is determined by the first correlation formula and a transmission bit rate of a redundant code, which is used at a time indicated by the time information included in the bit rate information including the transmission bit rate corresponding to the information indicating each the packet loss rate and which is determined based on the packet of the moving image data, and determines the packet loss rate, which makes the encode bit rate of the moving image data maximum based on the second correlation formula, and determines the redundancy, which is applied to the moving image data, based on the determined packet loss rate;
the moving image receiving apparatus includes:
- a data receiving unit to receive the moving image data from the moving image transmission apparatus; and
- a state information transmitting unit to transmit both of the packet loss rate of the moving image data, and time information indicating a time, at which the moving image transmission apparatus transmits each the packet included in the moving image data, to the moving image transmission apparatus.

11. A quality control method, comprising:
receiving network state information which includes both of a packet loss rate of moving image data caused at a certain time and time information indicating the certain time;
making a storage medium store bit rate information, which includes both of a transmitting bit rate of the moving image data used at a certain time and time information indicating the certain time, in association with the network state information which includes the time information;
reading both of the information indicating the packet loss rate, which is associated with the time information included in each packet of the moving image data and the transmission bit rate from the storage medium;
estimating a correlation between an encode bit rate and the packet loss rate of the moving image data based on each of the read information;
determining the packet loss rate, which makes the encode bit rate of the moving image maximum based on the correlation;
determining redundancy, which is applied to the moving image data based on the determined packet loss rate;
estimating a first correlation formula, which represents a correlation between the transmission bit rate and the packet loss rate, based on the information indicating the packet loss rate and the transmission bit rate;
estimating a second correlation formula, which represents the correlation between the encode bit rate and the packet loss rate of the moving image data based on a difference between the transmission bit rate which is corresponding to the information indicating each the packet loss rate and which is determined by the first correlation formula and a transmission bit rate of a redundant code, which is used at a time indicated by the time information included in the bit rate information including the transmission bit rate corresponding to the information indicating each the packet loss rate and which is determined based on the packet of the moving image data;
determining the packet loss rate, which makes the encode bit rate of the moving image data maximum based on the second correlation formula; and
determining the redundancy, which is applied to the moving image data, based on the determined packet loss rate.

12. A non-transitory recording medium storing a program to makes a computer execute:
- a process to receive network state information which includes both of a packet loss rate of moving image data caused at a certain time and time information indicating the certain time;
- a process to make a storage medium store bit rate information, which includes both of a transmitting bit rate of the moving image data used at a certain time and time information indicating the certain time, in association with the network state information which includes the time information;
- a process to read both of the information indicating the packet loss rate, which is associated with the time information included in each packet of the moving image and the transmission bit rate;
- a process to estimate a correlation between an encode bit rate and the packet loss rate of the moving image data based on each of the read information;
- a process to determine the packet loss rate, which makes the encode bit rate of the moving image maximum based on the correlation;

a process to determine redundancy, which is applied to the moving image data based on the determined packet loss rate a process to estimate a first correlation formula, which represents a correlation between the transmission bit rate and the packet loss rate, based on the information indicating the packet loss rate and the transmission bit rate;

a process to estimate a second correlation formula, which represents the correlation between the encode bit rate and the packet loss rate of the moving image data based on a difference between the transmission bit rate which is corresponding to the information indicating each the packet loss rate and which is determined by the first correlation formula and a transmission bit rate of a redundant code, which is used at a time indicated by the time information included in the bit rate information including the transmission bit rate corresponding to the information indicating each the packet loss rate and which is determined based on the packet of the moving image data;

a process to determine the packet loss rate, which makes the encode bit rate of the moving image data maximum based on the second correlation formula; and a process to determine the redundancy, which applied to the moving image data, based on the determined packet loss rate.

* * * * *

UNITED STATES PATENT AND TRADEMARK OFFICE
CERTIFICATE OF CORRECTION

PATENT NO. : 8,923,151 B2  Page 1 of 1
APPLICATION NO. : 13/509754
DATED : December 30, 2014
INVENTOR(S) : Ochiai It is certified that error appears in the above-identified patent and that said Letters Patent is hereby corrected as shown below:

In the specification
Column 4, Line 56: Delete "store" and insert -- to store --

In the claims
Column 25, Line 24: Claim 5, delete "lime information," and insert -- time information; --
Column 25, Line 65: Claim 7, delete "both" and insert -- both of --
Column 26, Line 3:  Claim 7, delete "hit" and insert -- bit --
Column 26, Line 22: Claim 8, delete "time," and insert -- time; --
Column 26, Line 64: Claim 9, delete "store" and insert -- to store --
Column 27, Line 27: Claim 10, delete "base" and insert -- based --
Column 27, Line 39: Claim 10, delete "information," and insert -- information --
Column 28, Line 47: Claim 12, delete "makes" and insert -- make --
Column 29, Line 25: Claim 12, delete "which" and insert -- which is --

Signed and Sealed this
Thirteenth Day of October, 2015

Michelle K. Lee
*Director of the United States Patent and Trademark Office*